(12) United States Patent
Huff et al.

(10) Patent No.: US 11,403,648 B1
(45) Date of Patent: Aug. 2, 2022

(54) OMNI-CHANNEL BRAND ANALYTICS INSIGHTS ENGINE, METHOD, AND SYSTEM

(71) Applicant: OPAL LABS INC., Portland, OR (US)

(72) Inventors: George M. Huff, Portland, OR (US); David Gorman, Portland, OR (US); Chris Campbell, Portland, OR (US); John Koenig, Portland, OR (US); Andrew Vy, Portland, OR (US); Federico Carthy, Portland, OR (US); Daniel Miller, Portland, OR (US)

(73) Assignee: Opal Labs Inc., Portland, OR (US)

( * ) Notice: Subject to any disclaimer, the term of this patent is extended or adjusted under 35 U.S.C. 154(b) by 0 days.

(21) Appl. No.: 15/452,673

(22) Filed: Mar. 7, 2017

Related U.S. Application Data

(60) Provisional application No. 62/306,465, filed on Mar. 10, 2016.

(51) Int. Cl.
    *G06Q 30/02*     (2012.01)
    *G06Q 50/00*     (2012.01)

(52) U.S. Cl.
    CPC ......... *G06Q 30/0201* (2013.01); *G06Q 50/01* (2013.01)

(58) Field of Classification Search
    CPC ............................ G06Q 30/02; G06Q 30/0201
    See application file for complete search history.

(56) References Cited

U.S. PATENT DOCUMENTS

| | | | | |
|---|---|---|---|---|
| 5,461,708 A | * | 10/1995 | Kahn | G06F 17/246 345/440 |
| 5,581,677 A | * | 12/1996 | Myers | G06T 11/206 345/440 |
| 6,839,681 B1 | * | 1/2005 | Hotz | G06Q 30/02 705/14.41 |
| 7,002,580 B1 | * | 2/2006 | Aggala | G06T 11/206 345/440 |
| 7,071,940 B2 | * | 7/2006 | Malik | G06T 11/206 345/440 |

(Continued)

OTHER PUBLICATIONS

Ergometrics.com webpages Feb.-Mar. 2000, Retrieved from Archive. org Jan. 2007 (Year: 2007).*

(Continued)

*Primary Examiner* — Scott L Jarrett
(74) *Attorney, Agent, or Firm* — Renaissance IP Law Group, LLP; David A. Crowther

(57) ABSTRACT

Embodiments include an omni-channel analytics branding insights engine. The omni-channel analytics branding insights engine can include an omni-channel platform data store configured to receive and store brand data, and an insights interface logic section. The insights interface logic section can receive brand data from the omni-channel platform data store. The insights interface logic section can include an interactive report generator, which can process the brand data, and generate one or more interactive reports based on the brand data for display on a display device. The omni-channel brand analytics insights engine quantifies branding strategies and assists in the understanding of what stories and themes drive the greatest impact, thereby providing key insights for optimizing current and future branding strategies.

20 Claims, 14 Drawing Sheets

(56) References Cited

U.S. PATENT DOCUMENTS

| | | | | |
|---|---|---|---|---|
| 7,343,294 B1* | 3/2008 | Sandholm | G06Q 10/0637 | |
| | | | 705/14.41 | |
| 7,917,382 B2* | 3/2011 | Cereghini | G06Q 30/02 | |
| | | | 705/7.29 | |
| 7,937,286 B2* | 5/2011 | Newman | G06Q 30/02 | |
| | | | 705/7.31 | |
| 8,255,836 B1* | 8/2012 | Gildfind | G06F 3/04883 | |
| | | | 715/863 | |
| 8,447,852 B1* | 5/2013 | Penumaka | G06Q 50/01 | |
| | | | 709/217 | |
| 8,914,496 B1* | 12/2014 | Richardson | H04L 43/08 | |
| | | | 709/224 | |
| 10,121,123 B1 | 11/2018 | Gomersall | | |
| 2004/0070606 A1* | 4/2004 | Yang | G06Q 30/02 | |
| | | | 715/745 | |
| 2005/0203804 A1* | 9/2005 | Suzuki | G06Q 10/06393 | |
| | | | 705/14.46 | |
| 2007/0016561 A1* | 1/2007 | Laustsen | G06F 17/248 | |
| 2009/0144129 A1* | 6/2009 | Grouf | G06F 17/3005 | |
| | | | 705/14.42 | |
| 2010/0005008 A1* | 1/2010 | Duncker | G06F 17/30893 | |
| | | | 705/26.1 | |
| 2010/0162152 A1* | 6/2010 | Allyn | G06F 3/0481 | |
| | | | 715/767 | |
| 2011/0249003 A1* | 10/2011 | Mercuri | G06T 11/206 | |
| | | | 345/440 | |
| 2013/0147828 A1* | 6/2013 | Vogel | G06F 16/26 | |
| | | | 345/589 | |
| 2013/0191455 A1* | 7/2013 | Penumaka | H04L 67/02 | |
| | | | 709/204 | |
| 2014/0028683 A1* | 1/2014 | Luo | G06T 11/206 | |
| | | | 345/440.2 | |
| 2014/0244345 A1* | 8/2014 | Sollis | G06Q 30/02 | |
| | | | 705/7.29 | |
| 2014/0249911 A1* | 9/2014 | Znerold | G06Q 30/0242 | |
| | | | 705/14.41 | |
| 2014/0279034 A1 | 9/2014 | Samuel | | |
| 2014/0330632 A1 | 11/2014 | Huddleston et al. | | |
| 2014/0337118 A1 | 11/2014 | Huddleston et al. | | |
| 2015/0066933 A1* | 3/2015 | Kolodziej | G06F 17/30554 | |
| | | | 707/737 | |
| 2015/0073952 A1* | 3/2015 | Ventura | G06Q 40/12 | |
| | | | 705/30 | |
| 2015/0120433 A1* | 4/2015 | Chaouki | G06Q 30/0242 | |
| | | | 705/14.41 | |
| 2015/0153918 A1* | 6/2015 | Chen | G06F 17/30312 | |
| | | | 715/771 | |
| 2015/0186473 A1* | 7/2015 | Chen | G06F 17/30554 | |
| | | | 707/603 | |
| 2015/0356160 A1* | 12/2015 | Berwick | G06F 17/30572 | |
| | | | 715/781 | |
| 2016/0026377 A1* | 1/2016 | Dreicer | G06Q 10/063 | |
| | | | 715/772 | |
| 2016/0103581 A1* | 4/2016 | Kim | G06F 3/0482 | |
| | | | 715/711 | |
| 2017/0351386 A1* | 12/2017 | Shurtleff | H04L 41/0853 | |
| 2018/0091652 A1* | 3/2018 | Lakdawala | H04M 3/5175 | |

OTHER PUBLICATIONS

Oracle Business Intelligence Publisher—Report Designer's Guide Release 10.1.3.4 Oracle, Aug. 2008 (Year: 2008).*
Tableau Visual Guidebook Tableau Software, 2010 (Year: 2010).*
SAS/Graph 9.2 Reference—Second Edition SAS Institute Inc., 2010 (Year: 2010).*
MacDonald, Matthew, Excel 2003 for Starters—Chapter 9—Creating Basic Charts O'Reilly Press, 2005 (Year: 2005).*

* cited by examiner

OMNI-CHANNEL BRAND ANALYTICS INSIGHTS ENGINE, METHOD, AND SYSTEM

RELATED APPLICATION DATA

This application claims the benefit of U.S. provisional patent application Ser. No. 62/306,465, filed Mar. 10, 2016, which is hereby incorporated by reference.

TECHNICAL FIELD

This application pertains to omni-channel analytics branding awareness, and more particularly, to an insights engine, method, and system for generating interactive reports that provide a comprehensive understanding and visibility of cross-channel content analytics.

BACKGROUND

Digital media is rapidly becoming one of the most important creative outlets for all kinds of businesses. While the Internet has enabled the inter-connection of a vast number of people and machines, billions of people are yet to connect to the Internet, but are expected to within a few years. The future growth of Internet users will continue to fuel the expansion of digital media. As users connect to the Internet, they inevitably become part of one or multiple social media groups by way of social media platforms such as Facebook®, Twitter®, LinkedIn®, Google+®, or the like. These users will also cause visits to webpages, email, forums, or the like, to also significantly increase.

It is challenging for businesses to maintain a comprehensive understanding and visibility of branding strategies because of the myriad channels, platforms, and outlets for creative branding content. Conventional technologies focus only on a specific channel at a time, and only after execution when content has gone live, thereby forcing branding and business departments to think about optimizing channels instead of optimizing their overall strategies.

Accordingly, a need remains for an omni-channel brand analytics insights engine, system, and method for providing key insights into global and omni-channel branding strategies. Embodiments of the inventive concept address these and other limitations in the prior art.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first digital media platform could be termed a second digital media platform, and, similarly, a second digital media platform could be termed a first digital media platform, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
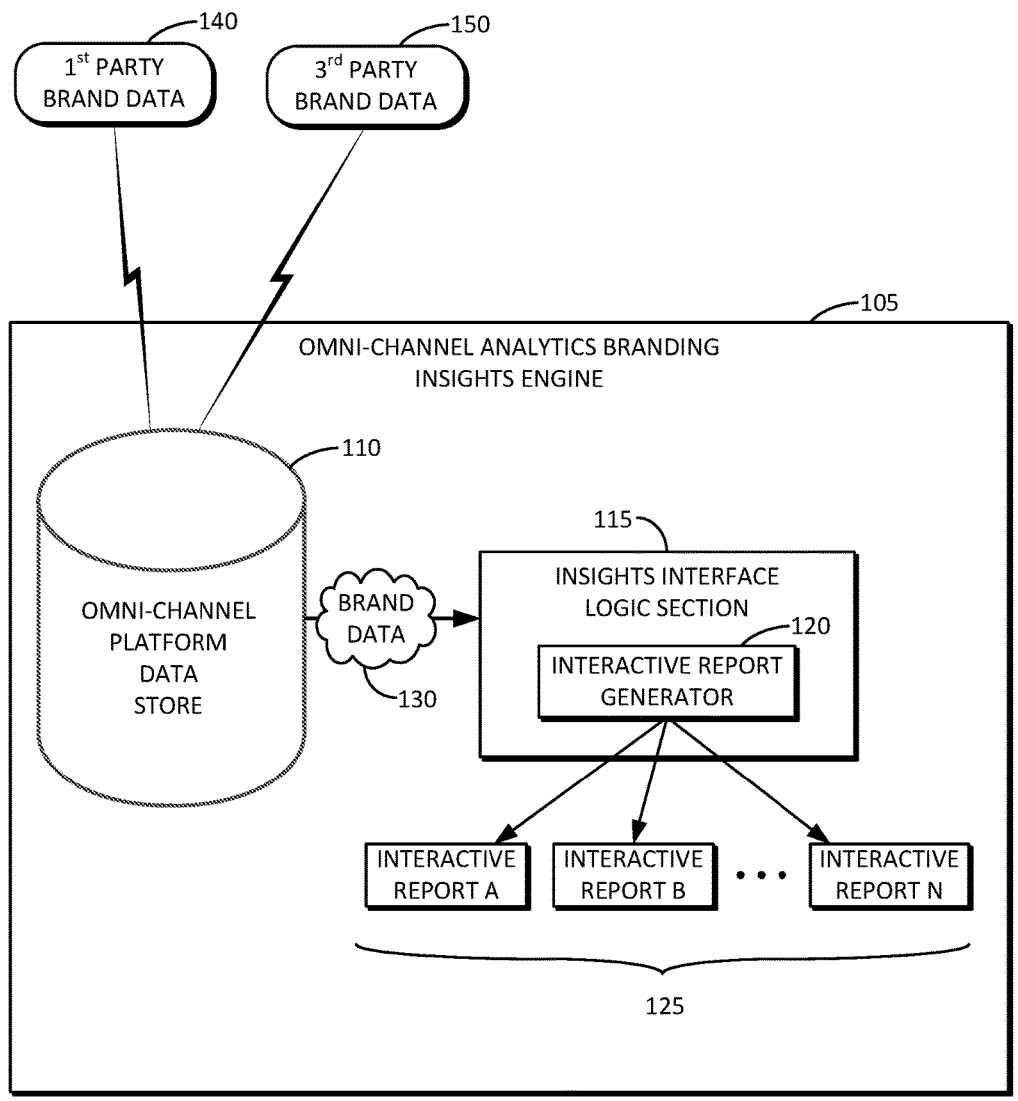
FIG. 1 illustrates a block diagram of an example omni-channel brand analytics insights engine in accordance with various embodiments of the present inventive concept.

FIG. 1 illustrates a block diagram of an example omni-channel brand analytics insights engine 105 in accordance with various embodiments of the present inventive concept. The omni-channel brand analytics insights engine 105 can include an omni-channel platform data store 110 coupled to an insights interface logic section 115. The insights interface logic section 115 can receive brand data 130 from the omni-channel platform data store 110, and visualize the brand data 130 by transforming the brand data 130 into one or more interactive reports 125 (e.g., reports A, B, through N). The brand data 130 can include names, terms, designs, symbols, or other features that distinguishes one seller's product from those of others. The brand data 130 can also include branding strategies for such sellers. The brand data 130 can also include information such as channels for delivering branding messages, accounts, associated content, or the like. The insights interface logic section 115 can include an interactive report generator 120, which can produce the one or more interactive reports 125, as further described in detail below.

Embodiments of the inventive concept disclosed herein include the ability to provide insights into cross-channel branding strategies and content analytics, which provide visibility into branding plans, and the follow-on execution of those branding plans. The omni-channel brand analytics insights engine 105 can quantify a branding strategy and assist the users to understand what stories and themes drive the greatest impact, thereby providing key insights for optimizing current and future branding strategies.

The omni-channel brand analytics insights engine 105 can provide a central reporting view of all global and omni-channel branding efforts, thereby providing insights into current and future branding strategies. Rather than having disparate and indefinite branding strategies, all can come together and be brought to life into an aggregate whole. The omni-channel brand analytics insights engine 105 can receive $1^{st}$ party brand data 140 to turn branding strategies into quantifiable interactive reports 125. Traditional branding analytics focus on a specific channel at a time, and only after execution when content has gone live, forcing marketers to think about optimizing channels instead of optimizing their strategies. In contrast, embodiments of the present inventive concept empower marketers with various interactive reports 125 to understand how their branding strategy will look before and during execution. Alternatively or in addition, the omni-channel analytics insights engine 105 can incorporate $3^{rd}$ party, post-execution performance brand data 150, such as that obtained from web and social media analytics tools, to create an even more robust and comprehensive perspective, allowing marketers to view and analyze pre- and post-execution performance data in a fully-integrated report.

The omni-channel brand analytics insights engine 105 extends beyond channel-specific analytics to measure and benchmark against an overall strategy. The omni-channel brand analytics insights engine 105 can leverage planning, content, and taxonomy data to surface and visualize a branding plan in action allowing the user to make strategic changes to the plan that result in a pronounced positive impact downstream.

The omni-channel brand analytics insights engine 105 allows users to determine whether they have an effective branding strategy across all channels, whether content is approved or not, what attributes are present, whether a branding plan or campaign is effective, and whether prescriptive changes are needed. The branding strategy or plan can be compared with what actually happened after going live. In other words, the results can be viewed globally across all channels, the unique impressions per channel, the overlaying of external data, the time periods in which certain content worked better than other, and so forth. The interactive reports 125 can present a friendly interface and ease-of-use so that a big-picture can be visualized quickly. Criteria can be applied to filter the information down as narrowly or broadly as desired, such as by geographic region, channel, label, asset, time, person, and so forth, as further described below. Pre-set reports can be accessed by the user, or customized reports generated in response to user selections. Performance of branding campaigns can be monitored over time or in real-time. In a real-time mode, there is no need to refresh the interactive reports as all of the information is automatically refreshed as events transpire in the real world.

Figure 2:
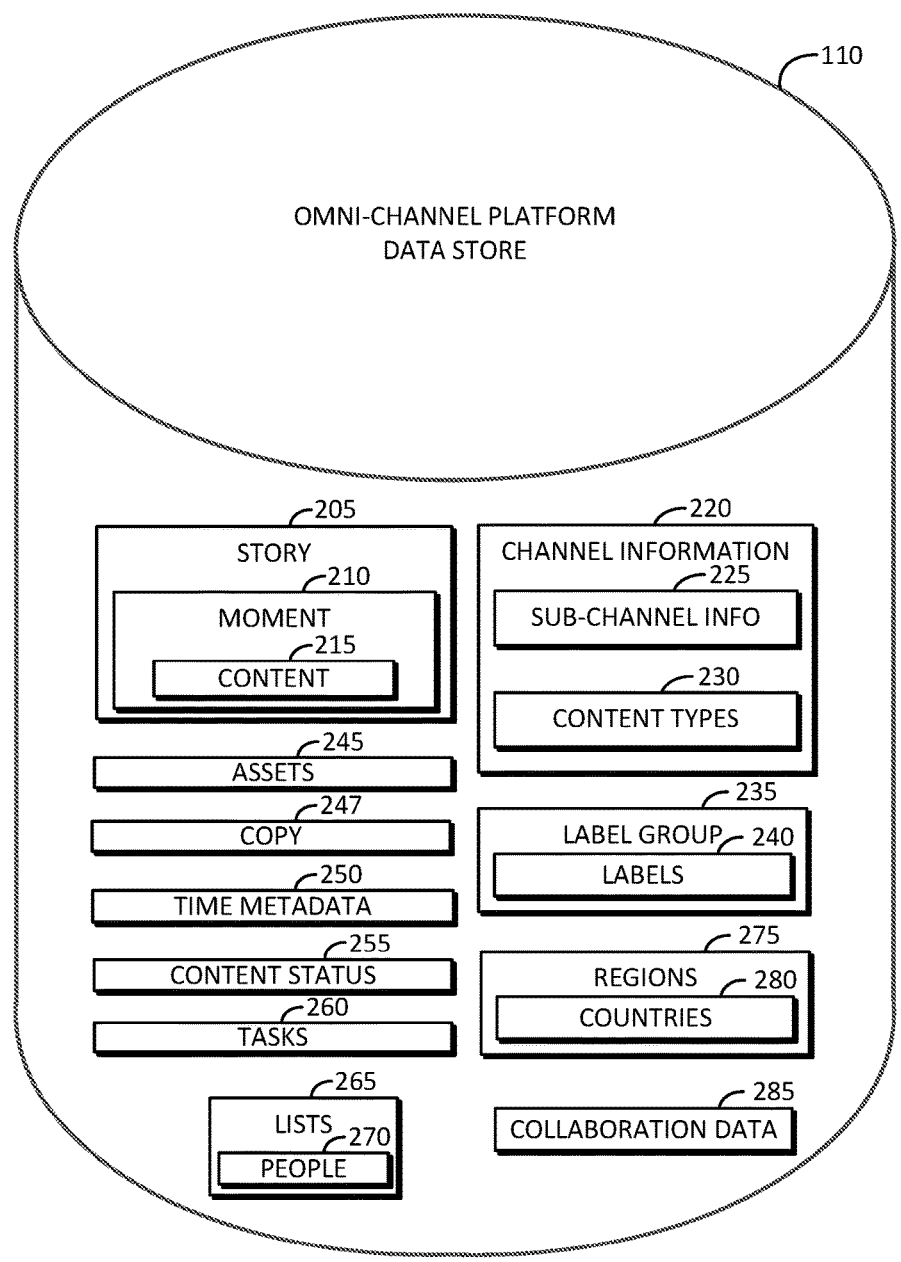
FIG. 2 illustrates a block diagram of an example omni-channel platform data store in accordance with various embodiments of the present inventive concept.

FIG. 2 illustrates a block diagram of the example omni-channel platform data store 110 in accordance with various embodiments of the present inventive concept. The omni-channel platform data store 110 can include a database having platform brand data, objects, attributes or the like. The data store 110 can be physically stored on a hard disk drive, a memory device, a flash storage device, an optical disc storage device, a cloud-based repository, or the like. The omni-channel platform data store 110 can store one or more stories 205. Each story 205 is a container for at least one of a brand campaign, a product launch, or an event. Each story 205 can include one or more moments 210. Each moment 210 represents a key point in time and is a container for content 215. The content 215 can include a specific brand touch point, or in other words, one or more particular aspects or components of the moment 210.

The omni-channel platform data store 110 can store assets 245. The assets 245 can include one or more photos, one or more videos clips, one or more sound clips, or the like. The omni-channel platform data store 110 can store copy 247, which can include one or more documents, one or more text sections, or the like. The omni-channel platform data store 110 can store time metadata attributes 250, such as date, duration, and/or time attributes. The time metadata attributes 250 can be assigned to or otherwise associated with corresponding stories 205, moments 210, and/or content 215.

The omni-channel platform data store 110 can store content status attributes 255, which can represent where the content 215 is located in a particular workflow. The omni-channel platform data store 110 can store one or more tasks 260, which are action items that need to be accomplished, and which can be assigned to users. The omni-channel platform data store 110 can store one or more lists 265, each of which is a grouping for particular people 270. The people 270 can be users of the omni-channel brand analytics insights engine 105.

The omni-channel platform data store 110 can store channel information 220. The channel information 220 can include information about one or more top level destinations for brands to put content. For example, the channel information 220 can include information about specific channels such as Facebook®, Twitter®, Google+®, Instagram®, websites, email, or the like. The channel information 220 can include sub-channel information 225. The sub-channel information 225 can include specific content outlets, such as particular accounts, within each channel. The channel information 220 can further include content types 230, which are different content formats within a given channel.

The omni-channel platform data store 110 can store one or more label groups 235, which are top-level groupings of metadata that can be configured by a user. Each label group 235 can include one or more labels 240. Each label 240 represents a particular descriptive value within the corresponding label group 235.

The omni-channel platform data store 110 can store multiple regions 275, which represent top-level groupings for countries 280. The countries 280 are values within the regions 275. In other words, each of the regions 275 stored in the data store 110 can include one or more countries 280. The omni-channel platform data store 110 can store collaboration data 285, which includes messaging and chat information between users of the omni-channel brand analytics insights engine 105.

Figure 3:
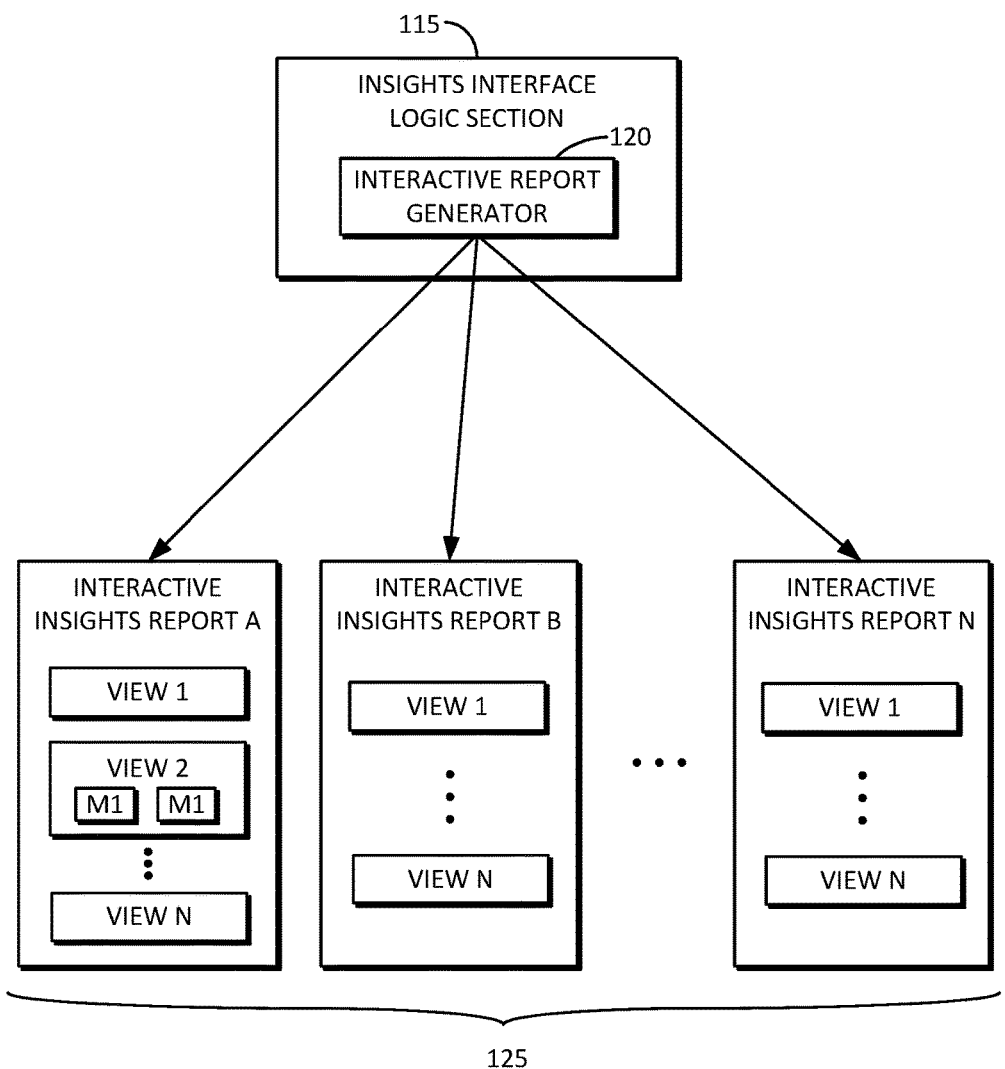
FIG. 3 illustrates a block diagram of an example insights interface logic section and associated interactive insights reports, in accordance with various embodiments of the present inventive concept.

FIG. 3 illustrates a block diagram of the example insights interface logic section 115 and associated interactive insights reports 125, in accordance with various embodiments of the present inventive concept. The insights interface logic section 115 can receive the brand data (e.g., 130 of FIG. 1) from the omni-channel platform data store 110, and visualize it in a way that delivers value on a macro level to a company or organization. The insights interface logic section 115 can include an interactive report generator 120. The interactive report generator 120 can produce one or more interactive insights reports 125 (e.g., interactive insights report A, interactive insights report B, through interactive insights report N). Each interactive insights report 125 is a starting point for looking at specific data types. For example, each of the interactive insights reports 125 can include one or more views (e.g., view 1 through view N). A view is a visualization that creates valuable insights for the user against selected criteria, such as time, data set, or the like. Each view (e.g., view 1 through view N) can include one or more modifiers (e.g., M1 and M2). The modifiers can be used to change how or what data is displayed in the corresponding view.

Figure 4:
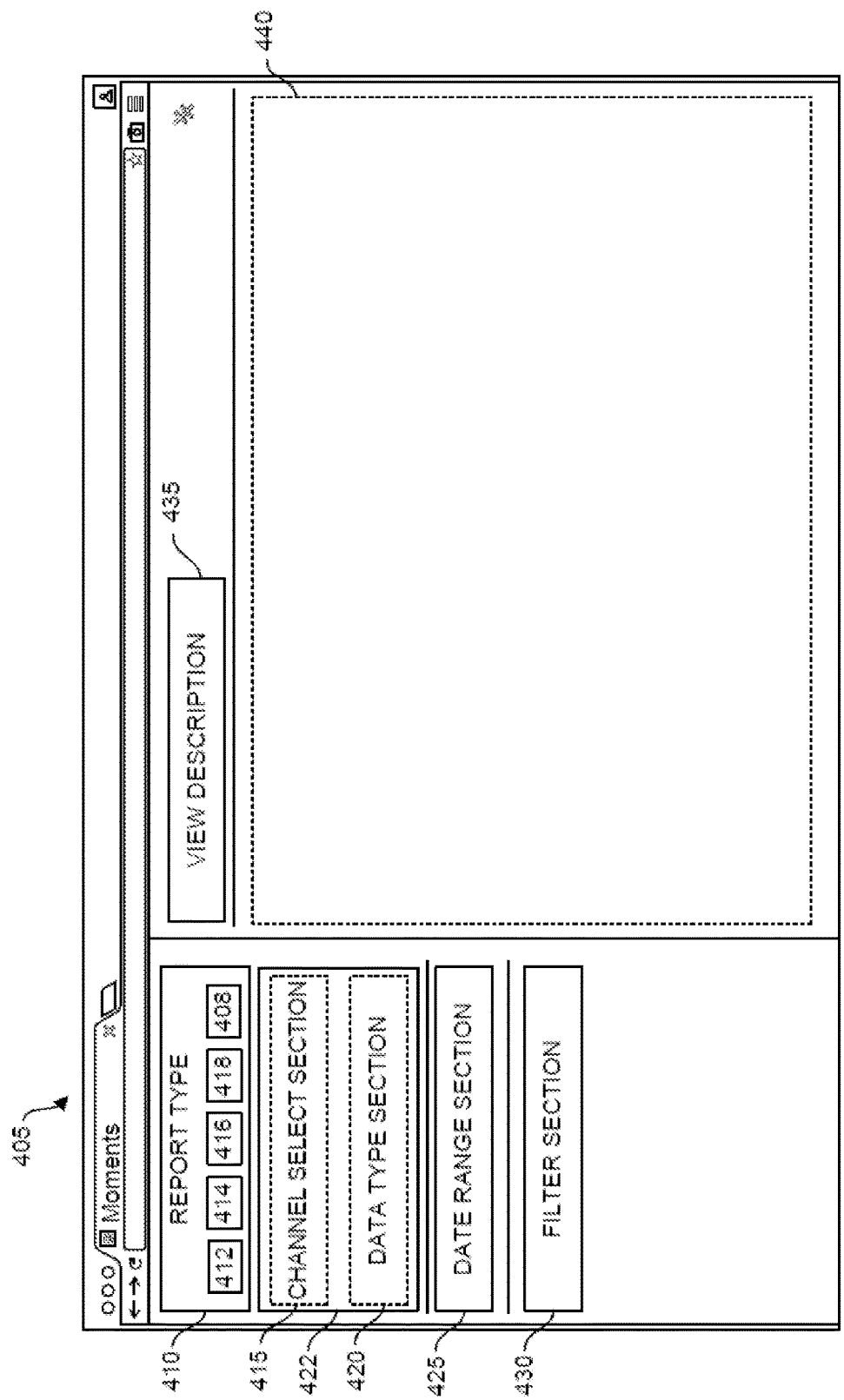
FIG. 4 illustrates a diagram of an example insights interface overview in accordance with various embodiments of the present inventive concept.

FIG. 4 illustrates a diagram of an example insights interface overview display 405 in accordance with various embodiments of the present inventive concept. The insights interface overview display 405 can include a report type selection section 410, which can include at least one of a channel distribution report type selection 412, a label distribution report type selection 414, a category distribution report type selection 416, an asset distribution report type selection 418, or a branding organization report type selection 408. Different insights based on report type can be selected, which provide for different views 440 based on the selections.

The insights interface overview display 405 can include a modifiers section 422 which can be used to change how or what data is displayed in a view 440. The modifiers section 422 can include a channel select section 415 by which a channel such as Facebook®, Twitter®, LinkedIn®, Google+®, web, mail, or the like, can be selected by the user. The modifiers section 422 can further include a data type section 420 by which the user can select a particular sub-channel (e.g., "Account") within the selected channel. The insights interface overview display 405 can include a date range section 425 by which a data range that limits the data visualized in the view 440 can be selected by the user. The insights interface overview display 405 can include a filter section 430 by which the user can limit the data viewed in the view 440 by only including data with selected filter criteria. The filter criteria can include a label group, a single label, an approval status, a region, an author, one or more stories, or the like. For example, if a label group is selected as the filter criteria, then the view 440 can display data only having a label that is part of the label group. By way of another example, if a single label is selected as the filter criteria, then the view 440 can display data only having the single label. By way of yet another example, if an approval status of "Approved" is selected as the filter criteria, then the view 440 can display only data associated with approved projects. By way of still another example, if a region of "Europe" is selected as the filter criteria, then the view 440 can display only data associated with Europe. By way of another example, if a particular name of an author is selected as the filter criteria, then the view 440 can display only data associated with that particular author. By way of yet another example, if a particular story (e.g., 205 of FIG. 2) is selected as the filter criteria, then the view 440 can display only data associated with that particular story.

The insights interface overview display 405 can include a view description 435. The view description 435 can include a description of the view 440 in a humanized sentence that can dynamically change based on different views, reports, and/or modifiers. For example, the view description 435 can include a humanized descriptive sentence such as: "Percentage breakdown for content across all channels." The view 440 can include a visualization that creates insight value for the user against their time and data selections. Each report (e.g., 125 of FIG. 2) can have one or more views 440.

Figure 5:
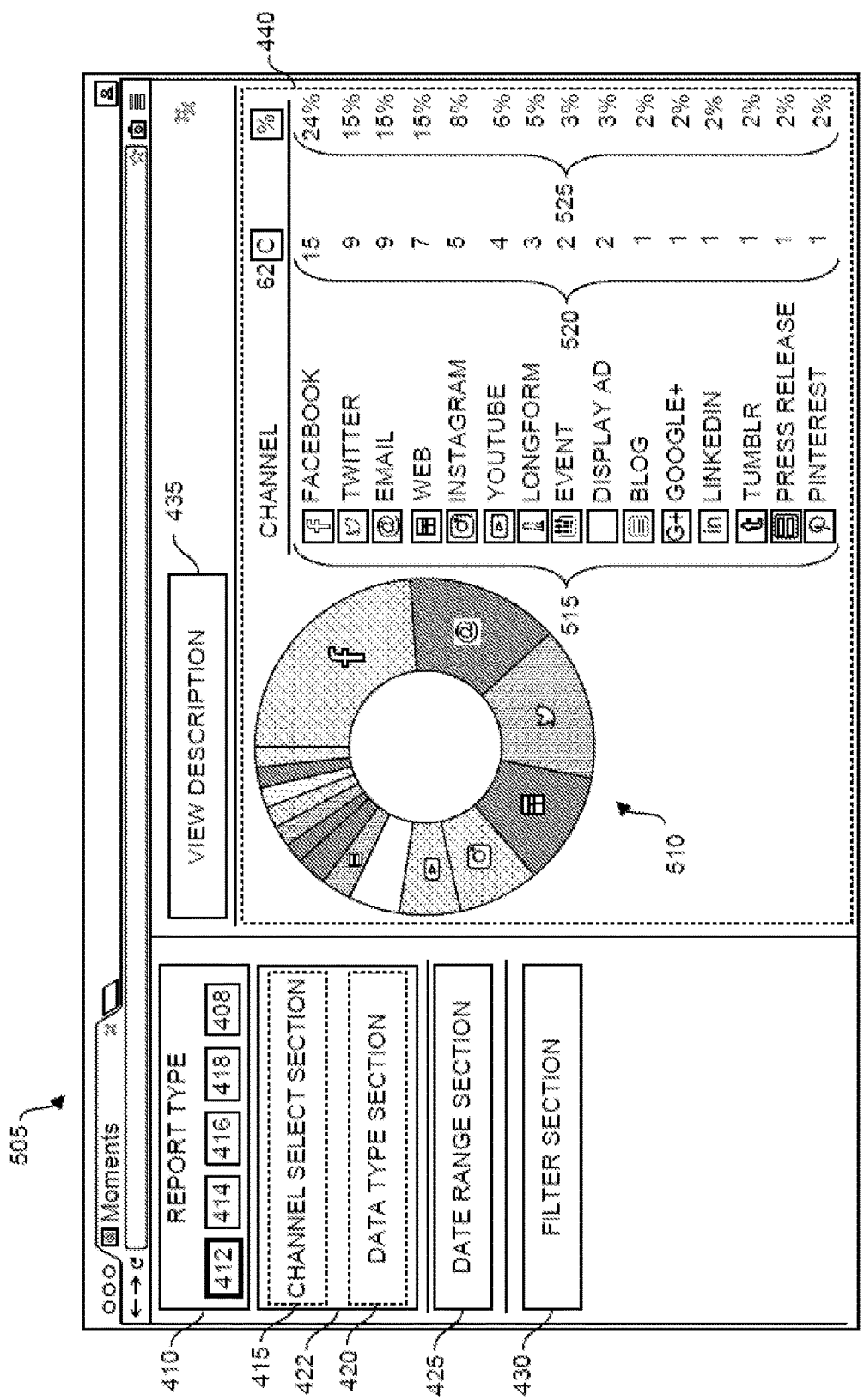
FIG. 5 illustrates a diagram of an example interactive channel distribution report including a branding channels view in accordance with various embodiments of the present inventive concept.

FIG. 5 illustrates a diagram of an example interactive channel distribution report 505 including a branding channels view in accordance with various embodiments of the present inventive concept. The interactive channel distribution report 505 can be displayed on a display device when a user indicates, by the report type selection section 410, a channel distribution report type selection 412. The interactive channel distribution report 505 can include a channel distribution interactive doughnut 510. The channel distribution interactive doughnut 510 can include a graph that illustrates the percentage of content each channel represents relative to the total created content. For example, 24% of the total content can be associated with Facebook®, 15% of the total content can be associated with Twitter®, 15% of the content can be associated with Email, 11% of the content can be associated with the Web, 8% of the content can be associated with Instagram®, 6% of the content can be associated with Youtube®, and so forth. The interactive channel distribution report 505 can include a channel list 515, each entry of which corresponds to a section of the channel distribution interactive doughnut 510. The channel list 515 can include corresponding counts 520 for each of the channels in the channel list 515, and corresponding percentages 525 associated with each count. For example, the channel Twitter® may have 15% of the content, corresponding to nine (9) content items, as shown in the example channel list 515, relative to all other channels. In other words, the channel distribution report type 412 can include a percentage of created content each channel from among a plurality of channels represents relative to a total amount of the created content associated with all of the plurality of channels.

The insights interface overview display 505 can include a date range section 425 by which a data range that limits the data visualized in the view 440 can be selected by the user. The insights interface overview display 505 can include a filter section 430 by which the user can limit the data viewed in the view 440 by only including data with selected criteria. The filter criteria can include a label group, a single label, an approval status, a region, an author, one or more stories, or the like, as described in greater detail above.

The interactive report generator 120 (of FIG. 3) can detect when a mouse pointer is hovering over an entry of the channel list 515, and cause the corresponding section of the channel distribution interactive doughnut 510 to be enlarged, highlighted, or the like. In other words, the corresponding section of the channel distribution interactive doughnut 510 can be made conspicuous. Similarly, the interactive report generator 120 (of FIG. 3) can detect when a mouse pointer is hovering over a section of the channel distribution interactive doughnut 510, and can cause an entry of the channel list 515 to be enlarged, highlighted, or the like. In other words, the corresponding member of the channel list 515 can be made conspicuous. It will be understood that such interaction can also be caused by a stylus, a finger selection, a keyboard, or the like.

Thus, interactive report generator 120 (of FIG. 3) can generate the interactive channel distribution report 505, and can automatically measure and track the distribution of content across all branding channels and for any duration or period of time before and after content goes live.

Figure 6:
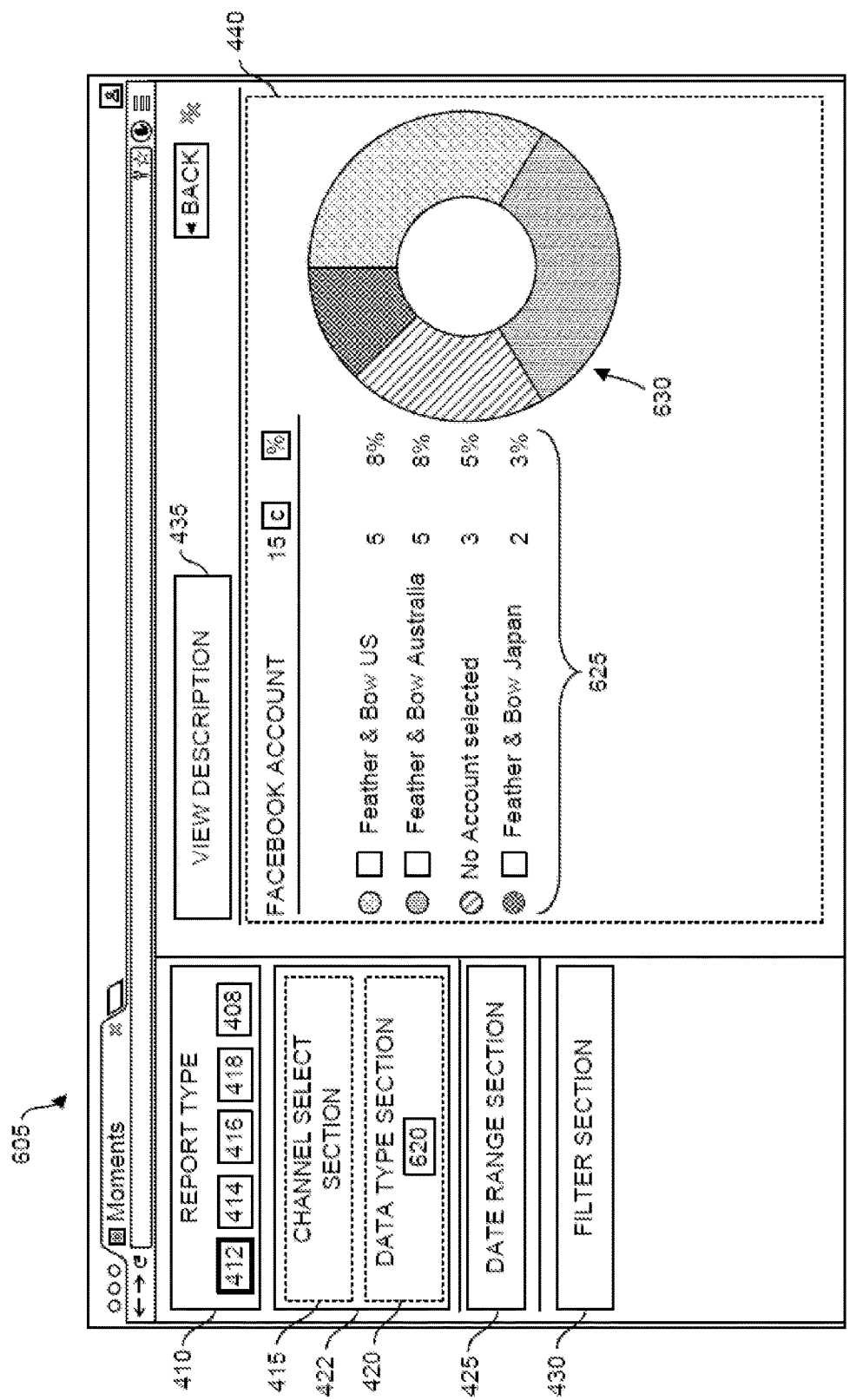
FIG. 6 illustrates a diagram of an example interactive channel distribution report including a single branding channel view having a channel and sub-channel modifier in accordance with various embodiments of the present inventive concept.

FIG. 6 illustrates a diagram of an example interactive channel distribution report 605 including a single branding channel view having a channel and sub-channel modifier in accordance with various embodiments of the present inventive concept. The interactive channel distribution report 605 can be displayed on a display device when a user indicates, by the report type selection section 410, a channel distribution report type selection 412. The interactive channel distribution report 605 can include the report type selection section 410, which can be a modifier for a single branding channel view. For example, the channel distribution report type selection 412 can indicate a "Channel Distribution" type report is selected. In addition, a particular channel, such as Facebook®, can be selected using the channel select section 415. In other words, in this view, everything that is shown is specifically about the channel selected in the channel select section 415.

The insights interface overview display 605 can include a date range section 425 by which a data range that limits the data visualized in the view 440 can be selected by the user. The insights interface overview display 605 can include a filter section 430 by which the user can limit the data viewed in the view 440 by only including data with selected criteria. The filter criteria can include a label group, a single label, an approval status, a region, an author, one or more stories, or the like, as described in greater detail above.

The interactive channel distribution report 605 can include the data type selection section 420 by which a sub-channel 620 can be used as a modifier value. In other words, a particular type of sub-channel (e.g., "Account Type") can be selected by the user. The sub-channels can be of different types and can have different terminology depending on the channel selected in the channel select section 415.

The interactive channel distribution report 605 can include a sub-channel list 625. The sub-channel list 625 can include various sub-channels associate with the selected channel and sub-channel type. The sub-channel list 625 can show which sub-channels have content created for them and what percentage of the total content is represented by each sub-channel. For example, when the sub-channel type is selected to be "Account" in the data type section 420, then the sub-channel list 625 can show an account "Feather & Bow US" having 8% of the total content, an account "Feather & Bow Australia" having 8% of the total content, an account "Feather & Bow Japan" having 3% of the total content, and so forth.

The interactive channel distribution report 605 can include a sub-channel interactive doughnut 630. The sub-channel interactive doughnut 630 is a visual representation of the combined values of the content created in all sub-channels of the selected channel in the channel select section 415. The interactive report generator 120 (of FIG. 3) can detect when a mouse pointer is hovering over an entry of the sub-channel list 625, and cause the corresponding section of the sub-channel interactive doughnut 630 to be enlarged, highlighted, or the like. In other words, the corresponding section of the sub-channel interactive doughnut 630 can be made conspicuous. Similarly, the interactive report generator 120 (of FIG. 3) can detect when a mouse pointer is hovering over a section of the sub-channel interactive doughnut 630, and can cause an entry of the sub-channel list 625 to be enlarged, highlighted, or the like. In other words, the corresponding member of the sub-channel list 625 can be made conspicuous. It will be understood that such interaction can also be caused by a stylus, a finger selection, a keyboard, or the like.

The insights interface overview display 605 can include a view description 435. The view description 435 can include a description of the view 440 in a humanized sentence that can dynamically change based on different views, reports, and/or modifiers. For example, the view description 435 can include a humanized descriptive sentence such as: "Percentage breakdown for content within Facebook®." The view 440 can include a visualization that creates insight value for the user against their time and data selections.

Thus, the interactive report generator 120 (of FIG. 3) can generate the interactive channel distribution report 605, and can automatically measure and track the distribution of content across sub-channels and content types for a specific channel (e.g., "Facebook®"), and for any duration or period of time before and after content goes live.

Figure 7:
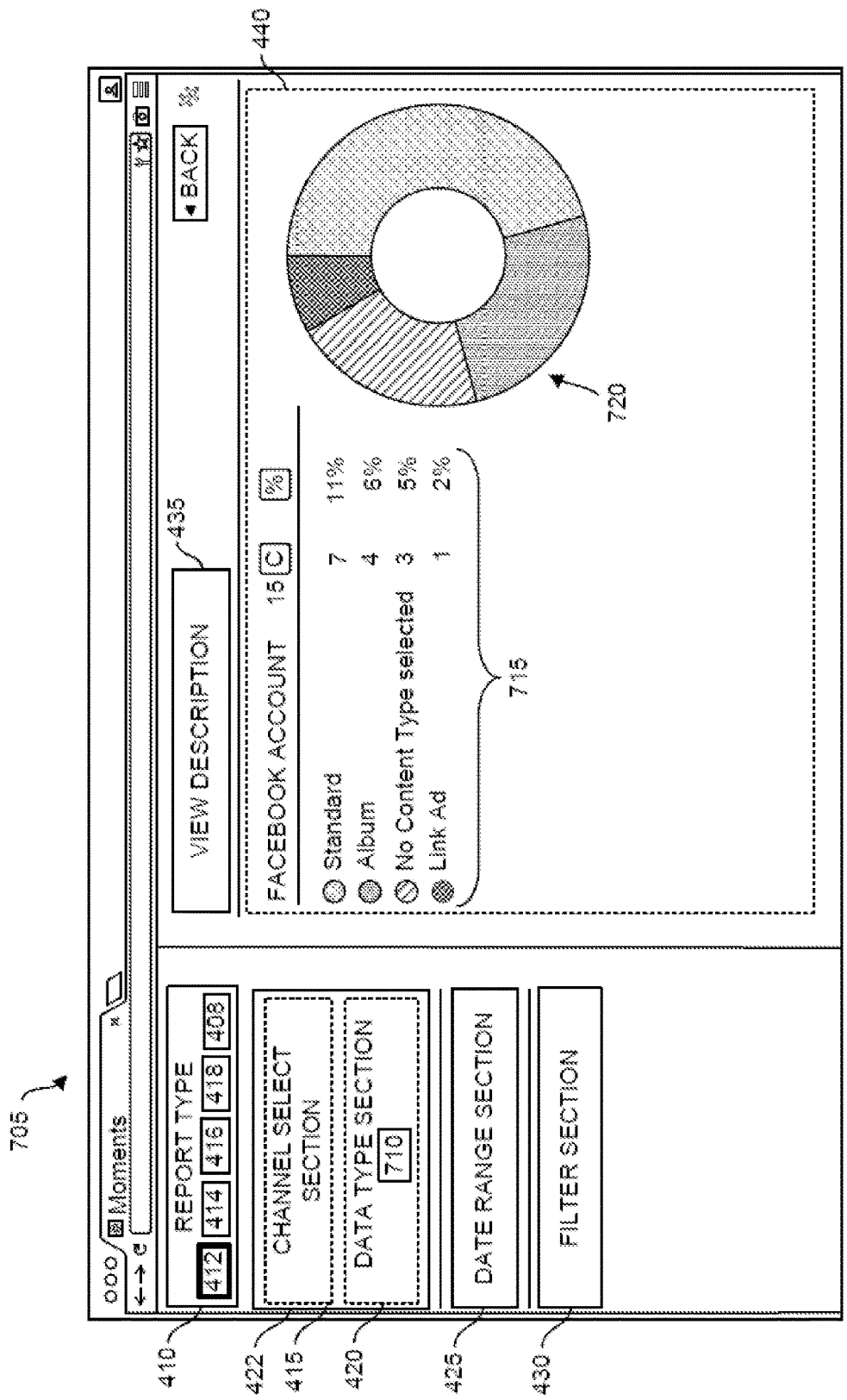
FIG. 7 illustrates a diagram of an example interactive content distribution report including a single branding channel view having a channel and content type modifier in accordance with various embodiments of the present inventive concept.

FIG. 7 illustrates a diagram of an example interactive content distribution report 705 including a single branding channel view having a channel and content type modifier in accordance with various embodiments of the present inventive concept. The interactive content distribution report 705 can be shown in response to a "Content Type" selection 710 in the data type selection section 420. In other words, when the sub-channel type is selected to be "Content Type," then the interactive content distribution report 705 can be displayed. The interactive content distribution report 705 can include a content type list 715. The content type list 715 can show which content types have been used across all content within the selected channel, and what percentage of the total content each content type represents. For example, the content type "Standard" can represent 11% of the total content, the content type "Album" can represent 6% of the total content, the content type "No Content Type selected" can represent 5% of the total content, the content type "Link Ad" can represent 2% of the total content, and so forth.

The insights interface overview display 705 can include a date range section 425 by which a data range that limits the data visualized in the view 440 can be selected by the user. The insights interface overview display 705 can include a filter section 430 by which the user can limit the data viewed in the view 440 by only including data with selected criteria. The filter criteria can include a label group, a single label, an approval status, a region, an author, one or more stories, or the like, as described in greater detail above.

The interactive content distribution report 705 can include a content type interactive doughnut 720. The content type interactive doughnut 720 is a visual representation of the combined values of the content created with all content types of the selected channel in the channel select section 415. The interactive report generator 120 (of FIG. 3) can detect when a mouse pointer is hovering over an entry of the content type list 715, and cause the corresponding section of the content type interactive doughnut 720 to be enlarged, highlighted, or the like. In other words, the corresponding section of the content type interactive doughnut 720 can be made conspicuous. Similarly, the interactive report generator 120 (of FIG. 3) can detect when a mouse pointer is hovering over a section of the content type interactive doughnut 720, and can cause an entry of the content type list 715 to be enlarged, highlighted, or the like. In other words, the corresponding member of the content type list 715 can be made conspicuous. It will be understood that such interaction can also be caused by a stylus, a finger selection, a keyboard, or the like.

The insights interface overview display 705 can include a view description 435. The view description 435 can include a description of the view 440 in a humanized sentence that can dynamically change based on different views, reports, and/or modifiers. For example, the view description 435 can include a humanized descriptive sentence such as: "Percentage breakdown for content within Facebook®." The view 440 can include a visualization that creates insight value for the user against their time and data selections.

Figure 8:
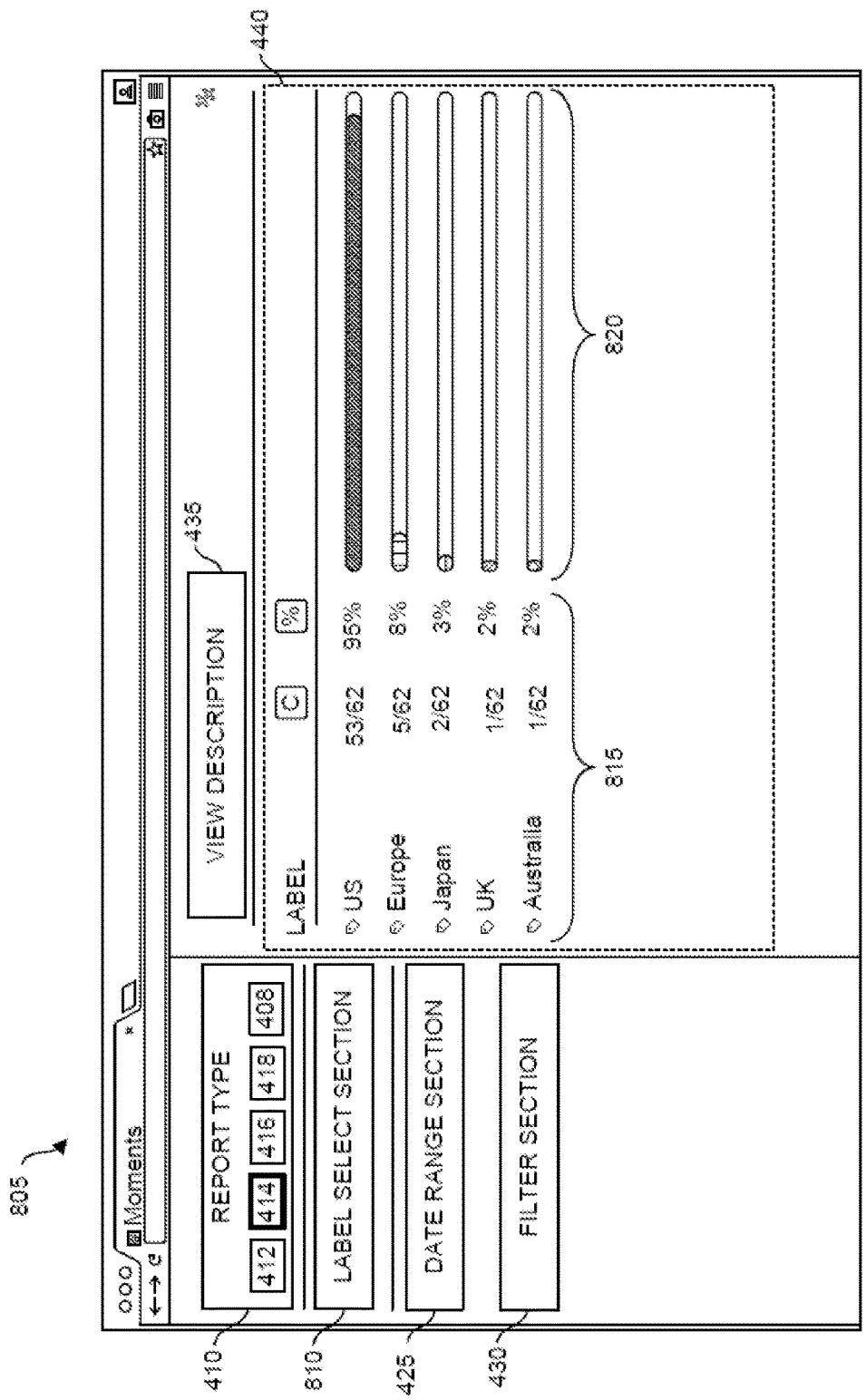
FIG. 8 illustrates a diagram of an example interactive label distribution report including a label group modifier in accordance with various embodiments of the present inventive concept.

FIG. 8 illustrates a diagram of an example interactive label distribution report 805 including a label modifier in accordance with various embodiments of the present inventive concept. The interactive label distribution report 805 can include the report type selection section 410 by which a "Label Frequency" type report can be selected. The interactive label distribution report 805 can be displayed on a display device when a user indicates, by the report type selection section 410, a label distribution report type selection 414. In addition, the interactive label distribution report 805 can include a label select section 810, which is a modifier for both of a label group frequency view and a single label frequency view. In this example, a label group frequency view 440 is shown. For example, a label group, such as "Regions," within the label select section 810 can be selected. In other words, in this view, everything that is shown is specifically associated with the label group "Regions" selected in the label select section 810.

The insights interface overview display 805 can include a date range section 425 by which a data range that limits the data visualized in the view 440 can be selected by the user. The insights interface overview display 805 can include a filter section 430 by which the user can limit the data viewed in the view 440 by only including data with selected criteria. The filter criteria can include a label group, a single label, an approval status, a region, an author, one or more stories, or the like, as described in greater detail above.

The interactive label distribution report 805 can include a label list 815, which can show all labels (e.g., US, Europe, Japan, UK, and Australia) associated with the label group "Regions" selected in the label select section 810. The label list 815 can show how frequently each particular label (e.g., US, Europe, Japan, UK, and Australia) is used relative to all pieces of content associated with the selected label group "Regions." For example, 95% of the total content is associated with the label "US," 8% of the total content is associated with the label "Europe," 3% of the total content is associated with the label "Japan," 2% of the total content is associated with the label "UK," 2% of the total content is associated with the label "Australia," and so forth. A bar graph 820 can be displayed adjacent the label list 815 to provide a convenient visual of the percentages listed in the label list 815.

The insights interface overview display 805 can include a view description 435. The view description 435 can include a description of the view 440 in a humanized sentence that can dynamically change based on different views, reports, and/or modifiers. For example, the view description 435 can include a humanized descriptive sentence such as: "Frequency of Regions labels on all content." The view 440 can include a visualization that creates insight value for the user against their time and data selections.

The user can assign one or more labels to content across all channels. The interactive report generator 120 (of FIG. 3) can generate the interactive label distribution report 805, and can allow the user to compare all content with similar labels, thereby providing a unique and channel-agnostic view of a branding strategy.

Figure 9:
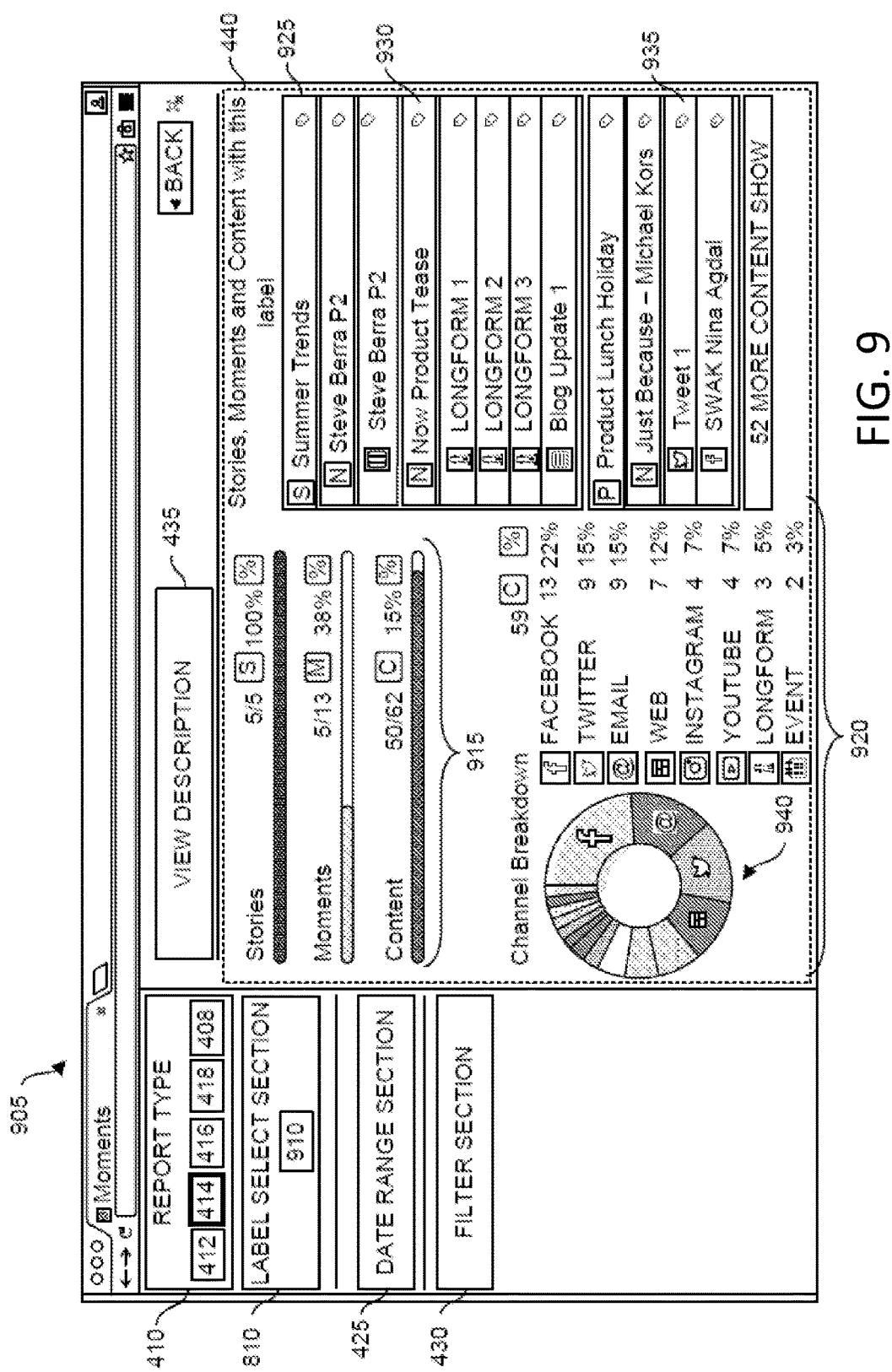
FIG. 9 illustrates a diagram of an example interactive label distribution report including a label frequency view in accordance with various embodiments of the present inventive concept.

FIG. 9 illustrates a diagram of an example interactive label distribution report 905 including a label frequency view in accordance with various embodiments of the present inventive concept. The interactive label distribution report 905 can include the report type selection section 410 by which a "Label Frequency" type report can be selected. The interactive label distribution report 905 can be displayed on a display device when a user indicates, by the report type selection section 410, a label distribution report type selection 414. In addition, the interactive label distribution report 905 can include the label select section 810, which is a modifier for both of a label group frequency view and a single label frequency view. In this example, a single label frequency view is shown. For example, a single label 910, such as "US," within the label select section 810 can be selected. In other words, in this view, everything that is shown is specifically associated with the label "US" selected in the label select section 810.

The insights interface overview display 905 can include a date range section 425 by which a data range that limits the data visualized in the view 440 can be selected by the user. The insights interface overview display 905 can include a filter section 430 by which the user can limit the data viewed in the view 440 by only including data with selected criteria. The filter criteria can include a label group, a single label, an approval status, a region, an author, one or more stories, or the like, as described in greater detail above.

The interactive label distribution report 905 can include a branding framework breakdown section 915, which can show how frequently a single label (e.g., "US") is used relative to each of the components (e.g., stories, moments, content) of the branding framework. For example, the label "US" 910 is used 100% of the time with stories, 38% of the time with moments, 95% of the time with content, and so forth. In other words, the label distribution report type 414 includes a percentage of label usage of a particular label (e.g., "US") for each of i) a branding stories component, i) a branding content moments component, and iii) a branding content component, of the branding framework relative to all labels across all of the channels.

The interactive label distribution report 905 can include a channel breakdown section 920, which can visualize which channels have the most content labeled with the selected label (e.g., "US"). For example, the channel breakdown section 920 can include a list of channels. The channel Facebook® can have 22% of the total content labeled with "US," Twitter® can have 15% of the total content labeled with "US," Email can have 15% of the total content labeled with "US," Web can have 12% of the total content labeled with "US," Instagram® can have 7% of the total content labeled with "US," Youtube® can have 7% of the total content labeled with "US," and so forth.

The channel breakdown section 920 can include a channel breakdown interactive doughnut 940. The interactive report generator 120 (of FIG. 3) can detect when a mouse pointer is hovering over an entry of the list of channels, and cause the corresponding section of the channel breakdown interactive doughnut 940 to be enlarged, highlighted, or the like. In other words, the corresponding section of the channel breakdown interactive doughnut 940 can be made conspicuous. Similarly, the interactive report generator 120 (of FIG. 3) can detect when a mouse pointer is hovering over a section of the channel breakdown interactive doughnut 940, and can cause an entry of the list of channels to be enlarged, highlighted, or the like. In other words, the corresponding member of the list of channels can be made conspicuous. It will be understood that such interaction can also be caused by a stylus, a finger selection, a keyboard, or the like.

The interactive label distribution report 905 can include a stories section 925, which can show stories that contain moments 930 and/or content 935 that have been labeled with the selected label (e.g., "US"), or are labeled as such themselves. For example, the "Summer Trends" story can include a "New Product Tease" moment 930 having various pieces of content such as "Longform 1," "Blog Update 1," and so forth. The moments (e.g., "New Product Tease") can include content (e.g., "Tweet 1") 935 that has been labeled with the selected label (e.g., "US") or that are labeled as such themselves. The content 935 can show the content having the selected label (e.g., "US").

The insights interface overview display 905 can include a view description 435. The view description 435 can include a description of the view 440 in a humanized sentence that can dynamically change based on different views, reports, and/or modifiers. For example, the view description 435 can include a humanized descriptive sentence such as: "Frequency of the label US on all content." The view 440 can include a visualization that creates insight value for the user against their time and data selections.

The interactive report generator 120 (of FIG. 3) can generate the interactive label distribution report 905, which provides a detailed view that aggregates and compares all content with a specific label, and how such content with that label has been distributed across all channels.

Figure 10:
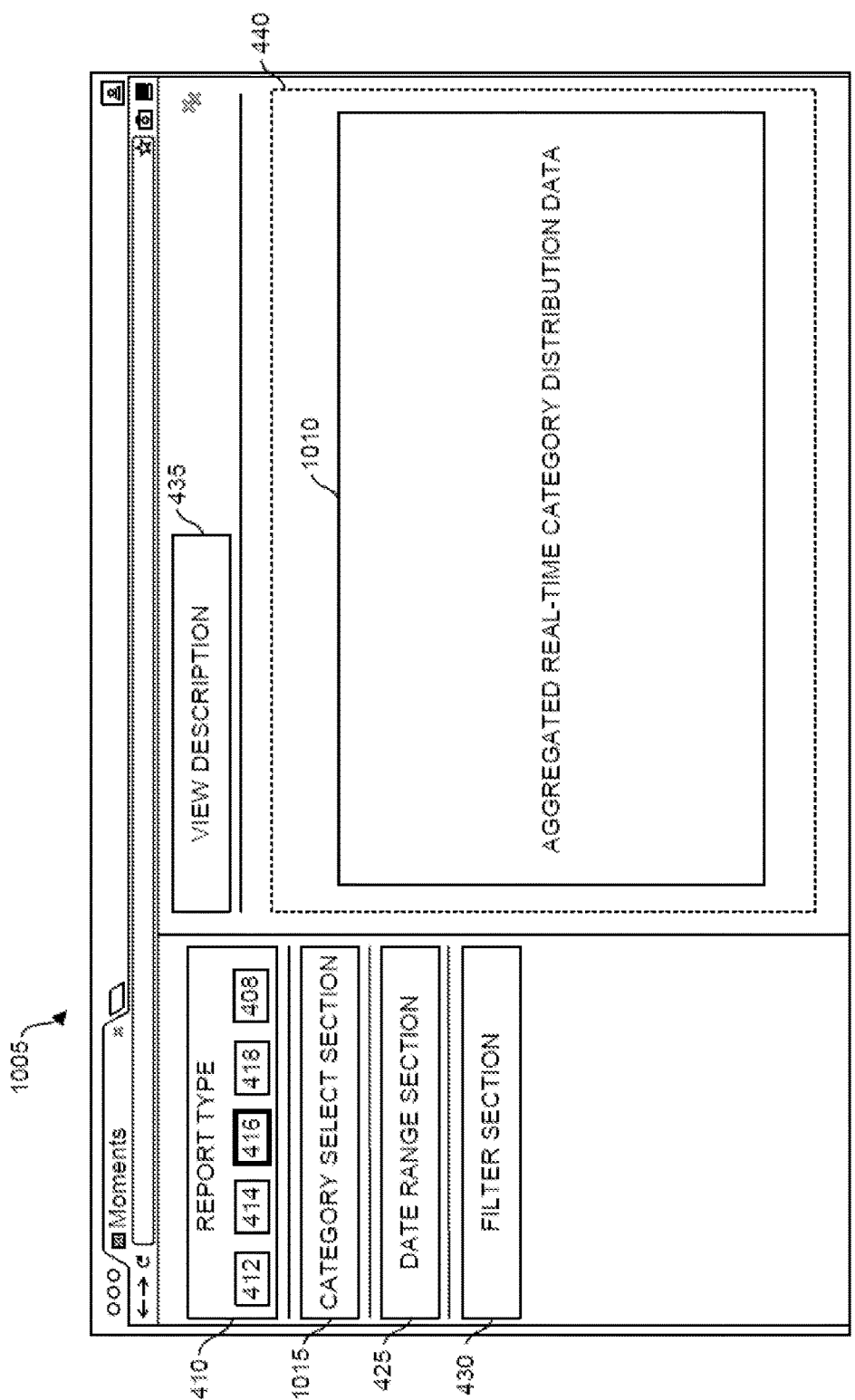
FIG. 10 illustrates a diagram of an example interactive category distribution report in accordance with various embodiments of the present inventive concept.

FIG. 10 illustrates a diagram of an example interactive category distribution report 1005 in accordance with various embodiments of the present inventive concept. The interactive report generator 120 (of FIG. 3) can generate the interactive category distribution report 1005. The interactive category distribution report 1005 can be displayed on a display device when a user indicates, by the report type selection section 410, a category distribution report type selection 416. The user can configure categories to organize the various channels according to their internal branding mix. In other words, each category can include one or more channels. The interactive category distribution report 1005 can automatically measure and track the distribution of content across all branding categories and for any duration or period of time before and after content goes live, and present the aggregated category distribution data 1010 in the category distribution view 440 in real-time. In other words, the user need not refresh the aggregated data 1010 as it is updated in real-time as events happen in the real world.

The interactive category distribution report 1005 can include a category select section 1015, which is a modifier for the aggregated real-time category data 1010. For example, the user can select a particular category to view more detailed information associated with the selected category. The insights interface overview display 1005 can include a date range section 425 by which a data range that limits the data visualized in the view 440 can be selected by the user. The insights interface overview display 1005 can include a filter section 430 by which the user can limit the data viewed in the view 440 by only including data with selected criteria. The filter criteria can include a label group, a single label, an approval status, a region, an author, one or more stories, or the like, as described in greater detail above.

Figure 11:
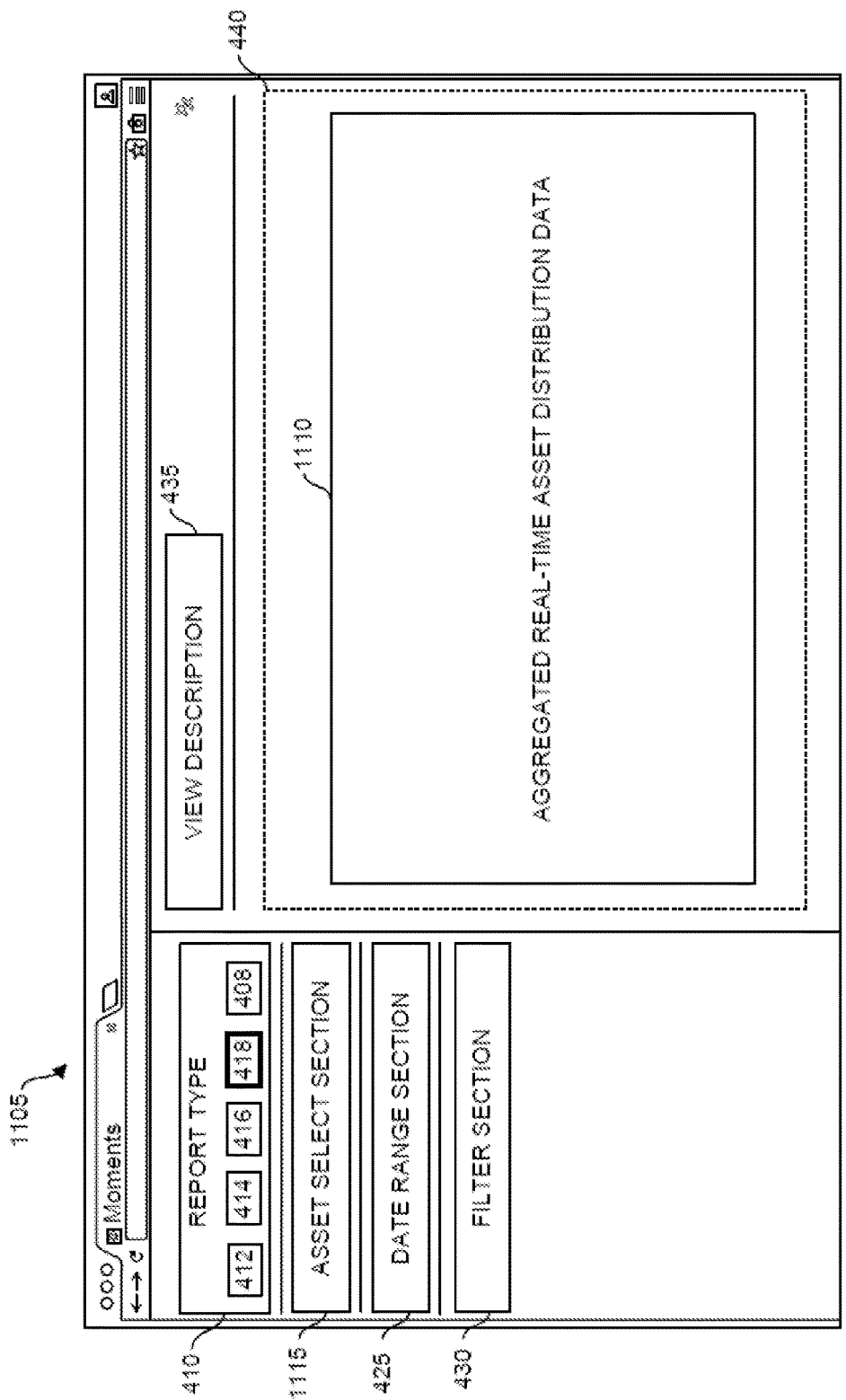
FIG. 11 illustrates a diagram of an example interactive asset distribution report in accordance with various embodiments of the present inventive concept.

FIG. 11 illustrates a diagram of an example interactive asset distribution report 1105 in accordance with various embodiments of the present inventive concept. The interactive report generator 120 (of FIG. 3) can generate the interactive asset distribution report 1105. The interactive asset distribution report 1105 can be displayed on a display device when a user indicates, by the report type selection section 410, an asset distribution report type selection 418. The asset distribution report 1105 can automatically measure and track a single asset used in content over the various categories, channels, geographies, teams, and versions, to map the overall return gained over any period or duration of time before and after the asset is used, and present the aggregated asset distribution data 1110 in the asset distribution view 440 in real-time. In other words, the user need not refresh the aggregated asset distribution data 1110 as it is updated in real-time as events happen in the real world.

The interactive asset distribution report 1105 can include an asset select section 1115, which is a modifier for the aggregated real-time asset distribution data 1110. For example, the user can select a particular asset to view more detailed information associated with the selected asset. The insights interface overview display 1105 can include a date range section 425 by which a data range that limits the data visualized in the view 440 can be selected by the user. The insights interface overview display 1105 can include a filter section 430 by which the user can limit the data viewed in the view 440 by only including data with selected criteria. The filter criteria can include a label group, a single label, an approval status, a region, an author, one or more stories, or the like, as described in greater detail above.

Figure 12:
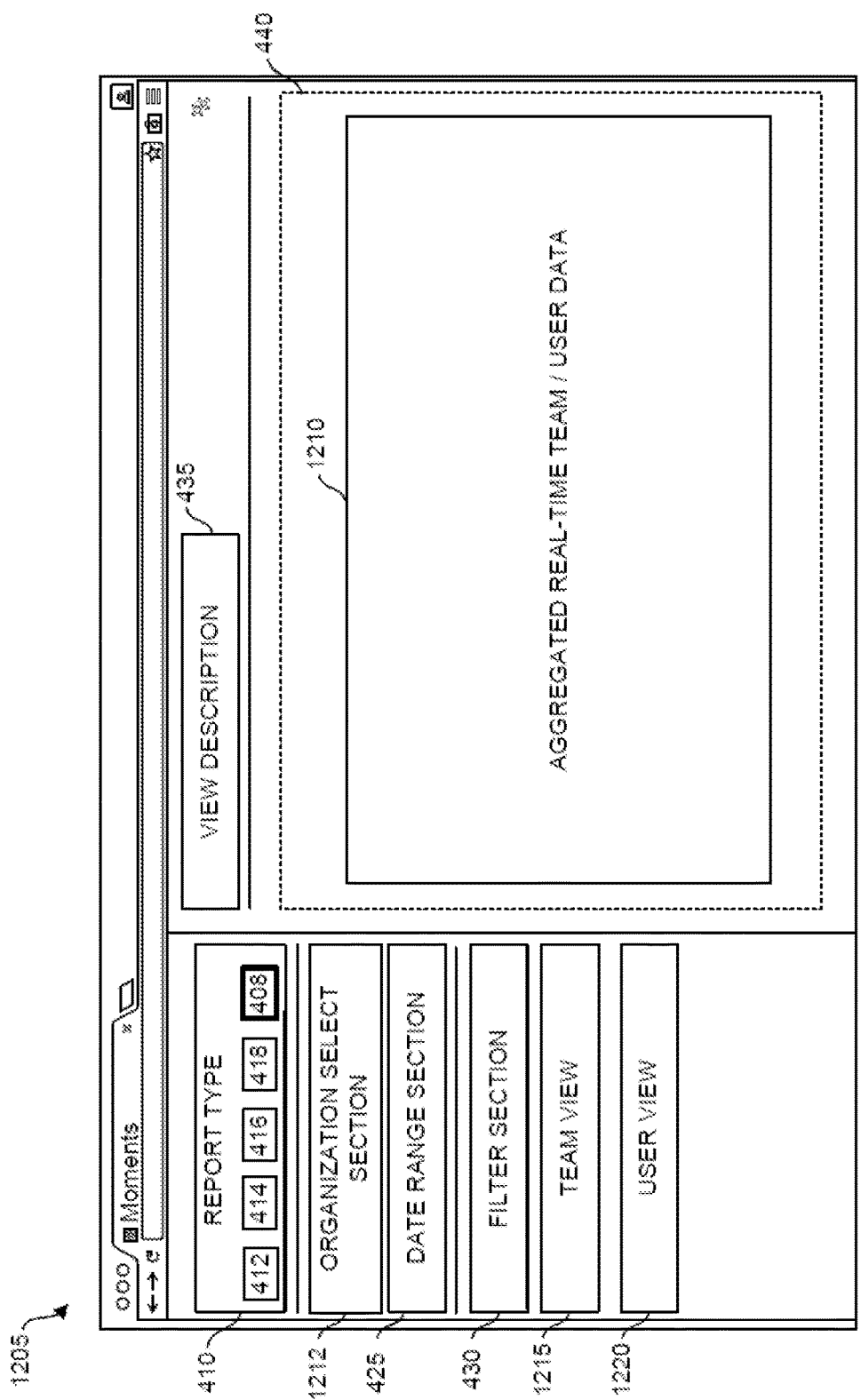
FIG. 12 illustrates a diagram of an example interactive branding organization report in accordance with various embodiments of the present inventive concept.

FIG. 12 illustrates a diagram of an example interactive branding organization report 1205 in accordance with various embodiments of the present inventive concept. The interactive report generator 120 (of FIG. 3) can generate the interactive branding organization report 1205. The interactive branding organization report 1205 can be displayed on a display device when a user indicates, by the report type selection section 410, a branding organization report type selection 408. The interactive branding organization report 1205 can include two separate views: a team view 1215 and a user view 1220. The team view 1215 can cause the report generator 120 to automatically measure and track team productivity in the form of aggregate content creation, type of content created, and greatest-performing content created in relation to other individual contributors and teams, and present the aggregated team data 1210 in the branding organization report view 440 in real-time. The user view 1220 can cause the report generator 120 to automatically measure and track individual productivity in the form of aggregate content creation, type of content created, and greatest-performing content created in relation to other individual contributors and teams, and present the aggregated user data 1210 in the branding organization report view 440 in real-time. In other words, the user need not refresh the aggregated team data 1210 as it is updated in real-time as events happen in the real world.

The interactive branding organization report 1205 can include an organization select section 1212, which is a modifier for the aggregated real-time team data and/or user data 1210. For example, the user can select a particular organization to view more detailed information associated with the selected organization. The insights interface overview display 1205 can include a date range section 425 by which a data range that limits the data visualized in the view 440 can be selected by the user. The insights interface overview display 1205 can include a filter section 430 by which the user can limit the data viewed in the view 440 by only including data with selected criteria. The filter criteria can include a label group, a single label, an approval status, a region, an author, one or more stories, or the like, as described in greater detail above.

Figure 13:
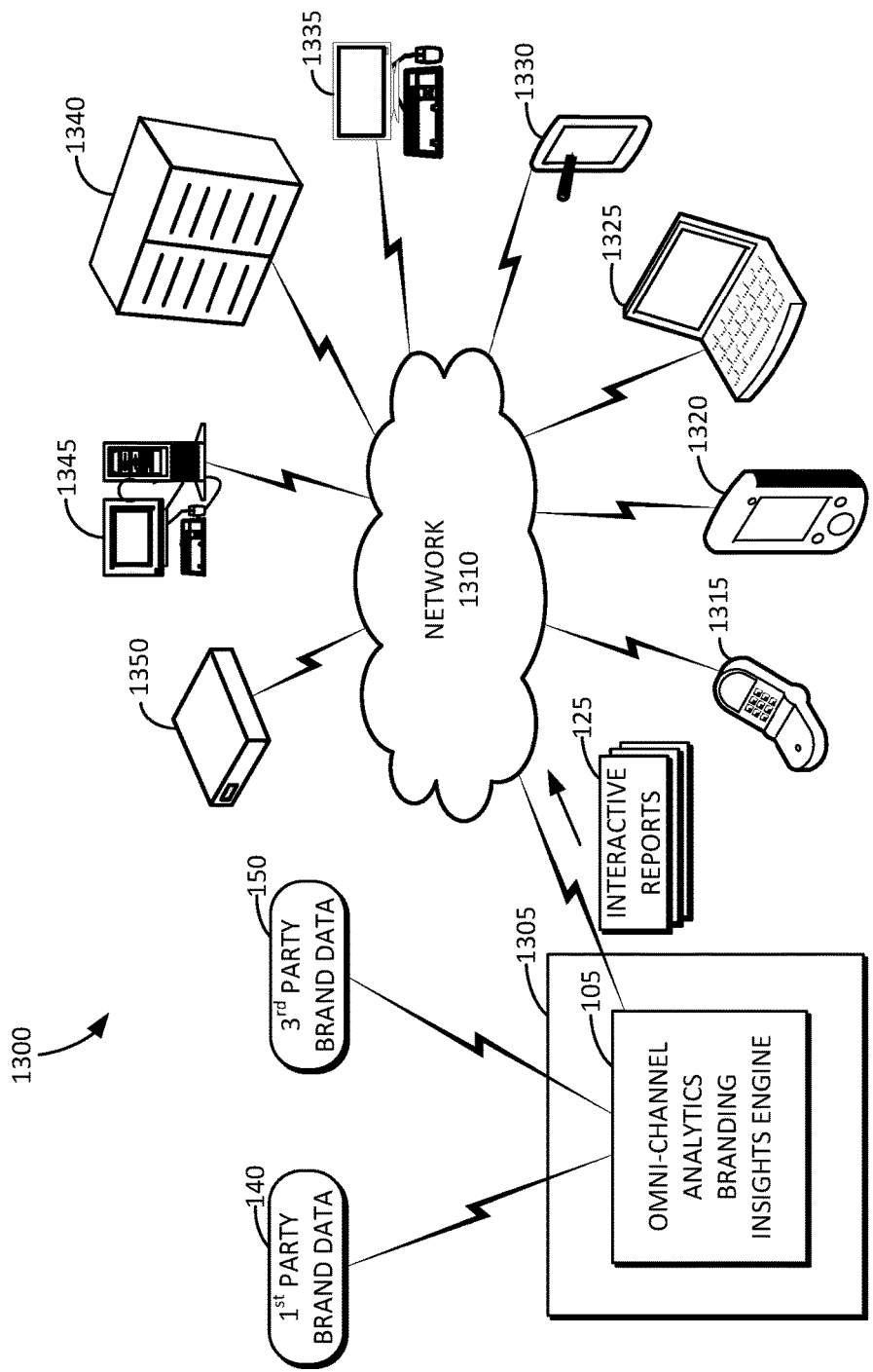
FIG. 13 illustrates a system diagram in accordance with embodiments of the inventive concept.

FIG. 13 illustrates a system diagram 1300 in accordance with embodiments of the inventive concept. The system 1300 can include a computer server 1305. The computer server 1305 can include the omni-channel analytics branding insights engine 105 described above. The computer server 1305 can be communicatively coupled to a network 1310. The network 1310 can be the Internet, a local area network (LAN), a wireless network, a cellular network, or other suitable computer network or cloud. The computer server 1305 can receive the $1^{St}$ party brand data 140 and/or the $3^{rd}$ party brand data 150 either directly or over the network 1310. The interactive reports 125 can be accessed by, for example, a mobile phone 1315, a smart phone 1320, a laptop computer 1325, a tablet 1330, a network terminal 1335, a database 1340, a computer 1345, and/or a cloud-based storage device 1350. In other words, the interactive reports 125 can be displayed on a display device of one or more of such computing devices. One or more users may simultaneously access the interactive reports 125 from one or more different devices from among such example devices over the network 1310.

The computer server 1305 can transmit the interactive reports 125 to one or more receiving computing devices (e.g., 1315, 1320, 1325, 1330, 1335, 1340, 1345, and/or 1350) over the network 1310. The receiving computing devices can include for example, the mobile phone 1315, the smart phone 1320, the laptop computer 1325, the tablet 1330, the network terminal 1335, the database 1340, the computer 1345, and/or the cloud-based storage device 1350. The user may then view and interact with the interactive reports 125 by way of a receiving computing device. The users can include end user consumers, marketing executives, branding partners, internal stakeholders, external stakeholders, or the like.

Figure 14:
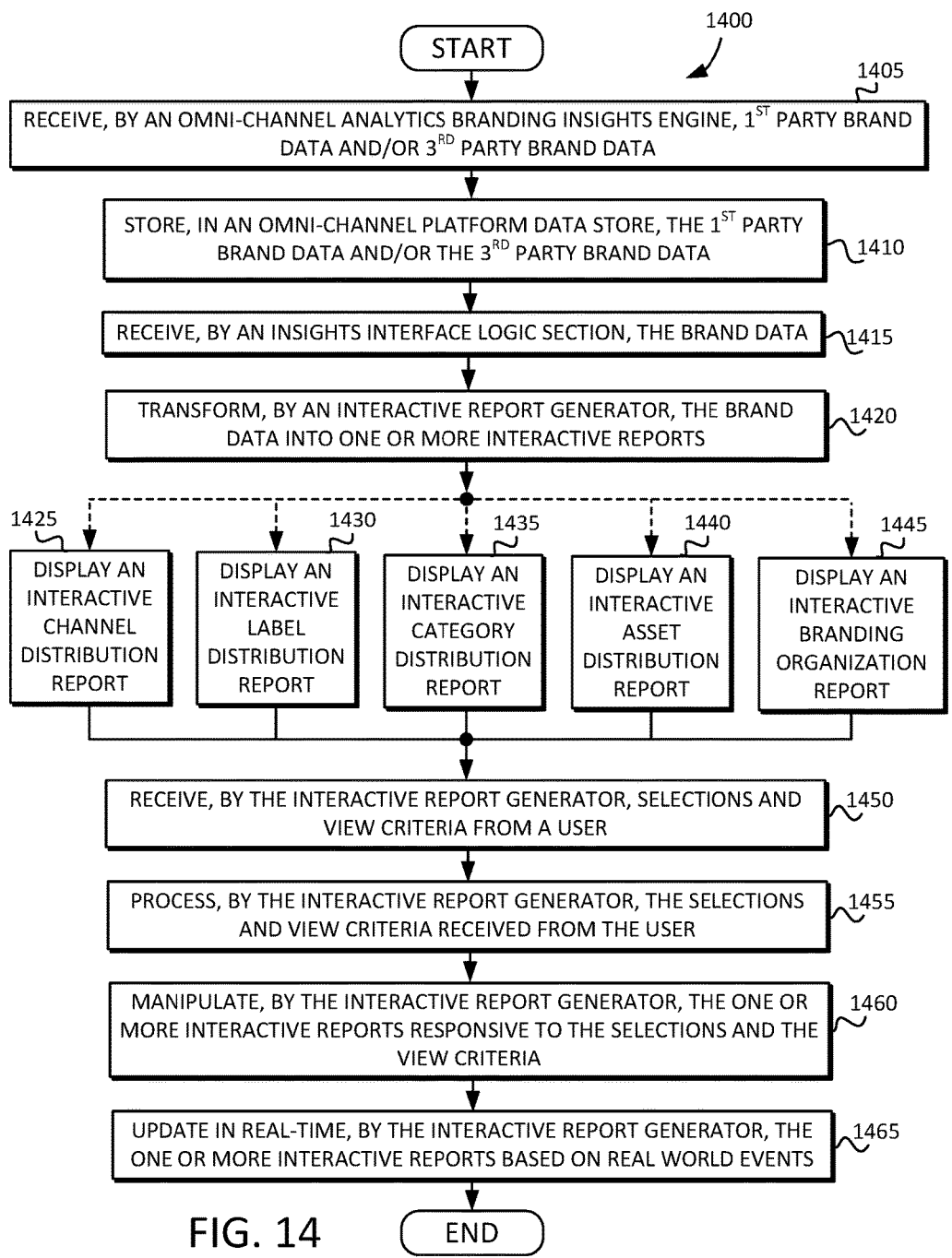
FIG. 14 is a flow diagram illustrating a technique for transforming brand data into one or more interactive reports in accordance with embodiments of the inventive concept.

FIG. 14 is a flow diagram 1400 illustrating a technique for transforming brand data into one or more interactive reports in accordance with embodiments of the inventive concept. The flow begins at 1405, where $1^{st}$ party brand data and/or $3^{rd}$ party brand data can be received by an omni-channel branding insights engine (e.g., 105 of FIG. 1). At 1410, an omni-channel platform data store (e.g., 110 of FIG. 1) can store the $1^{st}$ party brand data and/or the $3^{rd}$ party brand data. At 1415, an insights interface logic section (e.g., 115 of FIG. 1) can receive the brand data from the omni-channel platform data store. At 1420, an interactive report generator (e.g., 120 of FIG. 1) of the insights interface logic section can transform the brand data into one or more interactive reports.

The flow may follow one or more paths through 1425, 1430, 1435, 1440, and 1445. At 1425, the interactive report generator can display, on a display device, an interactive channel distribution report. At 1430, the interactive report generator can display, on the display device, an interactive label distribution report. At 1435, the interactive report generator can display, on the display device, an interactive category distribution report. At 1440, the interactive report generator can display, on the display device, an interactive asset distribution report. At 1445, the interactive report generator can display, on the display device, an interactive branding organization report.

At 1450, the interactive report generator can receive one or more selections or other view criteria from a user viewing the one or more interactive reports. At 1455, the interactive report generator can process the selections and/or view criteria received from the user. At 1460, the interactive report generator can manipulate the one or more interactive reports responsive to the selections and/or the view criteria. At 1465, the interactive report generator can update in real-time the one or more interactive reports based on real world events.

Some embodiments include an omni-channel analytics branding insights engine. The omni-channel analytics branding insights engine can include an omni-channel platform data store configured to receive and store brand data. The omni-channel analytics branding insights engine can further include an insights interface logic section coupled to the omni-channel platform data store. The insights interface logic section can be configured to receive the brand data from the omni-channel platform data store. The insights interface logic section can include an interactive report generator that is configured to process the brand data, and generate one or more interactive reports based on the brand data for display on a display device.

In some embodiments, the one or more interactive reports are each associated with a report type selected from among a plurality of report types. In some embodiments, the plurality of report types include a channel distribution report type and a label distribution report type. In some embodiments, the channel distribution report type includes a percentage of created content each channel from among a plurality of channels represents relative to a total amount of the created content associated with all of the plurality of channels. In some embodiments, the label distribution report type includes a label group frequency view and a single label frequency view.

In some embodiments, the channel distribution report type includes a list of the plurality of channels and a channel distribution interactive doughnut. In some embodiments, the interactive report generator is configured to detect when a pointer is hovering over a channel in the list of the plurality of channels, and to make conspicuous a corresponding section of the channel distribution interactive doughnut.

In some embodiments, the channel distribution report type includes a channel select section that is configured to receive a selection of a particular channel from among the plurality of channels. In some embodiments, the interactive report generator is configured to display a list of a plurality of sub-channels associated with the particular channel. In some embodiments, the list of the plurality of sub-channels includes a percentage of created content each sub-channel in the list of sub-channels represents relative to a total amount of the created content associated with the particular channel.

In some embodiments, the channel distribution report type includes a data type section that is configured to receive a selection of a particular data type from among a plurality of data types. In some embodiments, the interactive report generator is configured to display the list of the plurality of sub-channels associated with the particular channel and the particular data type.

In some embodiments, the particular data type is an account type. In some embodiments, each sub-channel in the list of the plurality of sub-channels is a different account within the particular channel. In some embodiments, the list of the plurality of sub-channels includes the percentage of the created content each account within the particular channel represents relative to the total amount of the created content associated with the particular channel.

In some embodiments, the channel distribution report type includes a sub-channel interactive doughnut associated with the list of the plurality of sub-channels. In some embodiments, the interactive report generator is configured to detect when a pointer is hovering over an account in the list of the plurality of sub-channels, and to make conspicuous a corresponding section of the sub-channel interactive doughnut.

In some embodiments, the particular data type is a content type. In some embodiments, each sub-channel in the list of the plurality of sub-channels is a different kind of content within the particular channel. In some embodiments, the list of the plurality of sub-channels includes the percentage of the created content each kind of content within the particular channel represents relative to the total amount of the created content associated with the particular channel.

In some embodiments, the channel distribution report type includes a sub-channel interactive doughnut associated with the list of the plurality of sub-channels. In some embodiments, the interactive report generator is configured to detect when a pointer is hovering over the different kind of content in the list of the plurality of sub-channels, and to make conspicuous a corresponding section of the sub-channel interactive doughnut.

In some embodiments, the label distribution report type includes a label select section that is configured to receive a selection of a particular label from among a plurality of labels. In some embodiments, the label distribution report type includes a branding framework breakdown section, including percentage of label usage of the particular label for each of i) a branding stories component, i) a branding moments component, and iii) a branding content component, of a branding framework relative to all labels across all of the plurality of channels.

In some embodiments, the label distribution report type includes a channel breakdown section having a list of channels labeled with the particular label, and a channel breakdown interactive doughnut. In some embodiments, the interactive report generator is configured to detect when a pointer is hovering over a channel in the list of channels labeled with the particular label, and to make conspicuous a corresponding section of the channel breakdown interactive doughnut.

In some embodiments, the label distribution report type includes a stories section having one or more stories labeled with the particular label, one or more moments labeled with the particular label, or one or more pieces of content labeled with the particular label.

In some embodiments, the label distribution report type includes a label select section that is configured to receive a selection of a particular label group from among a plurality of label groups. In some embodiments, the interactive report generator is configured to display a list of a plurality of labels associated with the particular label group. In some embodiments, the list of the plurality of labels includes a percentage of created content each label in the list of labels represents relative to a total amount of the created content associated with the particular label group.

In some embodiments, the one or more interactive reports are each associated with a report type selected from among a plurality of report types. In some embodiments, the plurality of report types include a category distribution report type, an asset distribution report type, and a branding organization report type.

In some embodiments, the category distribution report type includes a plurality of branding categories. In some embodiments, each branding category includes one or more channels from among the plurality of channels. In some embodiments, the interactive report generator is configured to display a distribution of content across the plurality of branding categories. In some embodiments, the category distribution report type includes a date range section that is configured to limit a view of the distribution of content by a date range. In some embodiments, the category distribution report type includes a filter section that is configured to limit the view of the distribution of content by selected filter criteria.

In some embodiments, the asset distribution report type includes an asset select section that is configured to receive a selection of a particular asset from among a plurality of assets. In some embodiments, the interactive report generator is configured to display aggregated asset distribution data associated with the particular asset. In some embodiments, the asset distribution report type includes a date range section that is configured to limit the aggregated asset data by a date range. In some embodiments, the asset distribution report type includes a filter section that is configured to limit the aggregated asset data by selected filter criteria.

In some embodiments, the branding organization report type includes a user view and a team view. In some embodiments, in the team view, the interactive report generator is configured to automatically measure and track team productivity including aggregate content creation, type of content created, and greatest-performing content created relative to other teams. In some embodiments, the interactive report generator is configured to display, on the display device, the measured and tracked team productivity. In some embodiments, in the user view, the interactive report generator is configured to automatically measure and track individual productivity including aggregate content creation, type of content created, and greatest-performing content created relative to other users. In some embodiments, the interactive report generator is configured to display, on the display device, the measured and tracked individual productivity.

In some embodiments, the interactive report generator is configured to update the one or more interactive reports in real-time without a need for manual refresh of the one or more interactive reports. In some embodiments, the one or more interactive reports include a filter section that is configured to limit a view of aggregated data by selected filter criteria, wherein the selected filter criteria include at least one of a label group, a single label, an approval status, a region, an author, or a story.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. An omni-channel analytics branding insights system, comprising:
   a mobile device including a display device configured to connect to a network;
   an analytics tool executable on a computer, wherein the analytics tool is configured to connect to the network, and to generate third party post-execution performance brand data obtained from at least one of the network or social media; and
   a remote computer server configured to communicate with the mobile device and the analytics tool over the network, wherein the remote computer server includes:
      an omni-channel platform data store including a database configured to receive first party brand data in real-time via the network and to store the first party brand data, and wherein the omni-channel platform data store is configured to receive the third party post-execution performance brand data in real-time via the network and to store the third part post-execution performance brand data;
      wherein the database of the omni-channel platform data store includes one or more stories;
      wherein each of the one or more stories includes one or more moments;
      wherein each of the one or more moments includes at least one of a brand campaign, a product launch, or an event;
      wherein each of the one or more moments is configured to contain content that is associated with the at least one of the brand campaign, the product launch, or the event;
      an insights interface logic section coupled to the omni-channel platform data store, wherein the insights interface logic section is configured to receive the first party brand data and the third party post-execution performance brand data in real-time from the omni-channel platform data store, and wherein the insights interface logic section includes an interactive report generator that is configured to process the first party brand data and the third party post-execution performance brand data in real-time, and to transform the first party brand data and the third party post-execution performance brand data into one or more interactive reports based on the first party brand data and the third part post-execution performance brand data configured to be displayed on the display device of the mobile device; and
a graphical user interface including a filter section and an interactive report section, wherein:

the graphical user interface is operable on at least one of the remote computer server or the mobile device;

the filter section of the graphical user interface is configured to filter the one or more interactive reports according to selected filter criteria, and to limit a view of the one or more interactive reports in the interactive report section of the graphical user interface on the display device of the mobile device according to the selected filter criteria, wherein the selected filter criteria includes at least one of a selected story from among the one or more stories, a label group, a single label, an approval status, a region, or an author;

the one or more interactive reports are each associated with a report type selected from among a plurality of report types in the interactive report section of the graphical user interface;

the plurality of report types include a channel distribution report type and a label distribution report type;

the channel distribution report type includes a percentage of created content each channel from among a plurality of channels represents relative to a total amount of the created content associated with all of the plurality of channels, wherein the plurality of channels includes at least one of a social media network, a website, or email;

the label distribution report type includes a label group frequency view and a single label frequency view;

the interactive report generator is configured to generate an interactive label distribution report including at least one of the label group frequency view or the single label frequency view, and to compare the created content with similar labels, thereby providing a channel-agnostic view of a branding strategy;

the channel distribution report type includes a list of the plurality of channels and a channel distribution interactive doughnut;

the interactive report generator of the remote computer server is configured to detect when a pointer is hovering over a channel in the list of the plurality of channels that are displayed in the interactive report section of the graphical user interface on the display device of the mobile device, and to make conspicuous a corresponding section of the channel distribution interactive doughnut that is displayed in the interactive report section of the graphical user interface on the display device of the mobile device; and the interactive report generator is configured to automatically refresh the one or more interactive reports in real-time on the mobile device based on real world events associated with at least one of the first party brand data or the third party post-execution performance brand data.

2. The omni-channel analytics branding insights system of claim 1, wherein:

the channel distribution report type includes a channel select section that is configured to receive a selection of a particular channel from among the plurality of channels;

the interactive report generator is configured to display a list of a plurality of sub-channels associated with the particular channel; and the list of the plurality of sub-channels includes a percentage of created content each sub-channel in the list of sub-channels represents relative to a total amount of the created content associated with the particular channel.

3. The omni-channel analytics branding insights system of claim 2, wherein:

the channel distribution report type includes a data type section that is configured to receive a selection of a particular data type from among a plurality of data types; and the interactive report generator is configured to display the list of the plurality of sub-channels associated with the particular channel and the particular data type.

4. The omni-channel analytics branding insights system of claim 3, wherein:

the particular data type is an account type;

each sub-channel in the list of the plurality of sub-channels is a different account within the particular channel; and the list of the plurality of sub-channels includes the percentage of the created content each account within the particular channel represents relative to the total amount of the created content associated with the particular channel.

5. The omni-channel analytics branding insights system of claim 4, wherein:

the channel distribution report type includes a sub-channel interactive doughnut associated with the list of the plurality of sub-channels; and the interactive report generator is configured to detect when a pointer is hovering over an account in the list of the plurality of sub-channels, and to make conspicuous a corresponding section of the sub-channel interactive doughnut.

6. The omni-channel analytics branding insights system of claim 3, wherein:

the particular data type is a content type;

each sub-channel in the list of the plurality of sub-channels is a different kind of content within the particular channel; and the list of the plurality of sub-channels includes the percentage of the created content each kind of content within the particular channel represents relative to the total amount of the created content associated with the particular channel.

7. The omni-channel analytics branding insights system of claim 6, wherein:

the channel distribution report type includes a sub-channel interactive doughnut associated with the list of the plurality of sub-channels; and the interactive report generator is configured to detect when a pointer is hovering over the different kind of content in the list of the plurality of sub-channels, and to make conspicuous a corresponding section of the sub-channel interactive doughnut.

8. The omni-channel analytics branding insights system of claim 1, wherein:

the label distribution report type includes a label select section that is configured to receive a selection of a particular label from among a plurality of labels; and the label distribution report type includes a percentage of label usage of the particular label for each of i) a branding stories component, i) a branding moments component, and iii) a branding content component, of a branding framework relative to all labels across all of the plurality of channels.

9. The omni-channel analytics branding insights system of claim 8, wherein:

the label distribution report type includes a channel breakdown section having a list of channels labeled with the particular label, and a channel breakdown interactive doughnut; and the interactive report generator is configured to detect when a pointer is hovering over a channel in the list of channels labeled with the particular label, and to make conspicuous a corresponding section of the channel breakdown interactive doughnut.

10. The omni-channel analytics branding insights system of claim 8, wherein:

the label distribution report type includes a stories section having the one or more stories labeled with the particular label, the one or more moments labeled with the particular label, or one or more pieces of content labeled with the particular label.

11. The omni-channel analytics branding insights system of claim 1, wherein:

the label distribution report type includes a label select section that is configured to receive a selection of a particular label group from among a plurality of label groups; and the interactive report generator is configured to display a list of a plurality of labels associated with the particular label group; and the list of the plurality of labels includes a percentage of created content each label in the list of labels represents relative to a total amount of the created content associated with the particular label group.

12. The omni-channel analytics branding insights engine system of claim 1, wherein:

the plurality of report types include a category distribution report type, an asset distribution report type, and a branding organization report type.

13. The omni-channel analytics branding insights system of claim 12, wherein:

the category distribution report type includes a plurality of branding categories;

each branding category includes one or more channels from among the plurality of channels;

the interactive report generator is configured to display a distribution of content across the plurality of branding categories;

the category distribution report type includes a date range section that is configured to limit a view of the distribution of content by a date range; and the category distribution report type includes a filter section that is configured to limit the view of the distribution of content by selected filter criteria.

14. The omni-channel analytics branding insights system of claim 12, wherein:

the asset distribution report type includes an asset select section that is configured to receive a selection of a particular asset from among a plurality of assets;

the interactive report generator is configured to display aggregated asset distribution data associated with the particular asset;

the asset distribution report type includes a date range section that is configured to limit the aggregated asset data by a date range; and the asset distribution report type includes a filter section that is configured to limit the aggregated asset data by selected filter criteria.

15. The omni-channel analytics branding insights system of claim 12, wherein:

the branding organization report type includes a user view and a team view;

in the team view, the interactive report generator is configured to automatically measure and track team productivity including aggregate content creation, type of content created, and greatest-performing content created relative to other teams;

the interactive report generator is configured to display, on the display device, the measured and tracked team productivity;

in the user view, the interactive report generator is configured to automatically measure and track individual productivity including aggregate content creation, type of content created, and greatest-performing content created relative to other users; and the interactive report generator is configured to display, on the display device, the measured and tracked individual productivity.

16. The omni-channel analytics branding insights system of claim 1, wherein the interactive report generator is configured to update the one or more interactive reports in real-time without a need for manual refresh of the one or more interactive reports.

17. The omni-channel analytics branding insights system of claim 1, wherein the one or more interactive reports include a filter section that is configured to limit a view of aggregated data by the selected filter criteria.

18. The omni-channel analytics branding insights system of claim 1, wherein:

the mobile device is a mobile smart phone;

the insights interface logic section of the remote computer server is configured to transform the first party brand data in real-time received via the network into the one or more interactive reports for display on the display device of the mobile smart phone; and the filter section is configured to filter the one or more interactive reports according to the selected filter criteria for display on the display device of the mobile smart phone, and to limit a view of the one or more interactive reports on the display device of the mobile smart phone according to the selected filter criteria.

19. The omni-channel analytics branding insights system of claim 18, wherein:

the filter section is a first filter section;

the selected filter criteria is first selected filter criteria;

the insights interface logic section of the remote computer server is configured to transform the first party brand data in real-time received via the network into the one or more interactive reports for display on a second display device of a mobile tablet;

the mobile tablet includes a second filter section;

the second filter section is configured to filter the one or more interactive reports according to second selected filter criteria for display on the display device of the mobile tablet, and to limit a view of the one or more interactive reports on the second display device of the mobile tablet according to the second selected filter criteria;

the insights interface logic section of the remote computer server is configured to transform the first party brand data in real-time received via the network into the one or more interactive reports for display on a third display device of a laptop computer;

the laptop computer includes a third filter section; and the third filter section is configured to filter the one or more interactive reports according to third selected filter criteria for display on the third display device of the laptop computer, and to limit a view of the one or more interactive reports on the third display device of the laptop computer according to the third selected filter criteria.

20. A method of performing omni-channel analytics, performed by a computer executing instructions in tangible memory, the method comprising:
connecting a mobile device including a display device to a network;
connecting an analytics tool that is executable on a computer to the network;
generating, by the analytics tool, third party post-execution performance brand data obtained from at least one of the network or social media;
communicating, by a remote computer server, with the mobile device and the analytics tool over the network;
receiving in real-time, by an omni-channel platform data storage device of the remote computer server, first party brand data via the network;
storing, in a database of the omni-channel platform data storage device of the remote computer server, the first party brand data received via the network;
receiving in real-time, by the omni-channel platform data storage device of the remote computer server, the third party post-execution performance brand data;
storing, in the database of the omni-channel platform data storage device of the remote computer server, the third party post-execution performance brand data;
storing, in the database of the omni-channel platform data storage device of the remote computer server, one or more stories;
wherein each of the one or more stories includes one or more moments;
wherein each of the one or more moments includes at least one of a brand campaign, a product launch, or an event;
wherein each of the one or more moments is configured to contain content that is associated with the at least one of the brand campaign, the product launch, or the event;
receiving in real-time via the network, by an insights interface logic section of the remote computer server that is coupled to the omni-channel platform data storage device of the remote computer server, the first party brand data from the omni-channel platform data storage device;
receiving in real-time via the network, by the insights interface logic section of the remote computer server that is coupled to the omni-channel platform data storage device of the remote computer server, the third party post-execution performance brand data from the omni-channel platform data storage device;
processing in real-time, by an interactive report generator of the insights interface logic section of the remote computer server, the first party brand data and the third party post-execution performance brand data;
transforming, by the interactive report generator of the insights interface logic section of the remote computer server, the first party brand data and the third party post-execution performance brand data received via the network into one or more interactive reports based on the first party brand data and the third party post-execution performance brand data;
displaying, on the display device of the mobile device, the one or more interactive reports;
filtering, by a filter section of a graphical user interface that is operable on at least one of the remote computer server or the mobile device, the one or more interactive reports according to selected filter criteria;
wherein the selected filter criteria include at least one of a selected story from among the one or more stories, a label group, a single label, an approval status, a region, or an author, and wherein the filtering includes limiting a view of the one or more interactive reports in an interactive report section of the graphical user interface on the display device of the mobile device according to the selected filter criteria;
associating, by the interactive report generator of the insights interface logic section of the remote computer server, the one or more interactive reports with a report type selected from among a plurality of report types in the interactive report section of the graphical user interface, wherein the plurality of report types include a channel distribution report type and a label distribution report type, wherein the channel distribution report type includes a percentage of created content each channel from among a plurality of channels represents relative to a total amount of the created content associated with all of the plurality of channels, and wherein the plurality of channels includes at least one of a social media network, a website, or email;
wherein the label distribution report type includes a label group frequency view and a single label frequency view;
generating, by the interactive report generator, an interactive label distribution report including at least one of the label group frequency view or the single label frequency view;
comparing the created content with similar labels, thereby providing a channel-agnostic view of a branding strategy;
wherein the channel distribution report type includes a list of the plurality of channels and a channel distribution interactive doughnut;
detecting, by the interactive report generator of the insights interface logic section of the remote computer, when a pointer is hovering over a channel in the list of the plurality of channels that are displayed in the interactive report section of the graphical user interface on the display device of the mobile device;
making conspicuous, by the interactive report generator of the insights interface logic section of the remote computer server, a corresponding section of the channel distribution interactive doughnut that is displayed in the interactive report section of the graphical user interface on the display device of the mobile device; and
automatically refreshing in real-time, by the interactive report generator, the one or more interactive reports on the mobile device based on real world events associated with at least one of the first party brand data or the third party post-execution performance brand data.

* * * * *